US012073811B2

(12) United States Patent
Seery

(10) Patent No.: US 12,073,811 B2
(45) Date of Patent: Aug. 27, 2024

(54) TUNING PIN TOOL

(71) Applicant: James Boustead Seery, Newcastle upon Tyne (GB)

(72) Inventor: James Boustead Seery, Newcastle upon Tyne (GB)

(*) Notice: Subject to any disclaimer, the term of this patent is extended or adjusted under 35 U.S.C. 154(b) by 0 days.

(21) Appl. No.: 17/766,294

(22) PCT Filed: Oct. 5, 2020

(86) PCT No.: PCT/GB2020/052447
§ 371 (c)(1),
(2) Date: Apr. 4, 2022

(87) PCT Pub. No.: WO2021/064429
PCT Pub. Date: Apr. 8, 2021

(65) Prior Publication Data

US 2024/0054977 A1 Feb. 15, 2024

(30) Foreign Application Priority Data

Oct. 3, 2019 (GB) ...................................... 1914298
Nov. 15, 2019 (GB) ...................................... 1916642
Oct. 2, 2020 (WO) ................ PCT/GB2020/052434

(51) Int. Cl.
*G10C 9/00* (2019.01)
*G10C 3/106* (2019.01)

(52) U.S. Cl.
CPC ............... *G10C 9/00* (2013.01); *G10C 3/106* (2013.01)

(58) Field of Classification Search
CPC .................................. G10C 9/00; G10C 3/106
See application file for complete search history.

(56) References Cited

U.S. PATENT DOCUMENTS

| | | | | | |
|---|---|---|---|---|---|
| 107,391 | A * | 9/1870 | Lindsay | G10C 3/106 | 84/203 |
| 118,354 | A * | 8/1871 | Faas | G10C 3/106 | 84/203 |
| 235,269 | A * | 12/1880 | McBride | G10C 3/106 | 84/203 |
| 259,604 | A * | 6/1882 | Thorpe | G10C 3/106 | 84/203 |
| 293,088 | A * | 2/1884 | Rogers | G10C 3/106 | 84/203 |
| 982,425 | A * | 1/1911 | Gotterke | G10C 3/106 | 84/203 |

(Continued)

FOREIGN PATENT DOCUMENTS

| | | | | |
|---|---|---|---|---|
| DE | 246801 C | 11/1911 | | |
| FR | 2793936 A1 * | 11/2000 | | G10C 3/106 |

(Continued)

*Primary Examiner* — Robert W Horn
(74) *Attorney, Agent, or Firm* — The Belles Group, P.C.

(57) ABSTRACT

A tool for fitting to a tuning pin of an instrument for inhibiting movement of the tuning pin. The tool comprises a tuning pin engaging portion comprising a through hole for engaging a tuning pin and one or more flexible resilient arms extending from the tuning pin engaging portion. The one or more flexible resilient arms configured, in use, to engage with other tuning pins adjacent to the tuning pin, and/or with the strings attached thereto, to inhibit movement of the tuning pin.

16 Claims, 22 Drawing Sheets

(56) References Cited

U.S. PATENT DOCUMENTS

| | | | | | |
|---|---|---|---|---|---|
| 1,094,653 | A * | 4/1914 | Hillcoat | G10C 3/106 84/203 |
| 1,298,862 | A * | 4/1919 | Bachman | G10C 3/106 84/203 |
| 1,924,720 | A * | 8/1933 | Kringel | G10C 3/106 84/201 |
| 3,754,494 | A * | 8/1973 | Ticehurst | G10C 3/106 84/203 |
| 4,509,399 | A * | 4/1985 | McKibben | G10C 9/00 84/234 |
| 5,869,780 | A * | 2/1999 | Lim | G10C 3/106 84/202 |
| 11,380,289 | B1 * | 7/2022 | Jenson | G10C 3/04 |

FOREIGN PATENT DOCUMENTS

| | | | | |
|---|---|---|---|---|
| GB | 2587673 | A * | 4/2021 | G10C 3/10 |
| WO | WO-2021064429 | A1 * | 4/2021 | G10C 9/00 |

* cited by examiner

TUNING PIN TOOL

CROSS-REFERENCE TO RELATED PATENT APPLICATIONS

The present application is a U.S. national stage application under 35 U.S.C. § 371 of PCT Application No. PCT/GB2020/052447 filed Oct. 5, 2020, which claims priority to United Kingdom Patent Application No. 1914298.3 filed Oct. 3, 2019, United Kingdom Patent Application No. 1916642.0 filed Nov. 15, 2019, and PCT Patent Application No. PCT/GB2020/052434 filed Oct. 2, 2020. The disclosures of the aforementioned priority applications are incorporated herein by reference in their entireties.

TECHNICAL FIELD

The present invention relates to tools for use in the tuning of instruments, particularly pianos.

BACKGROUND

Chordophones are musical instruments which make sound by way of vibrating strings. The strings of chordophone instruments can be vibrated by being either plucked, bowed, or hammered. Hammered chordophones include pianofortes; plucked chordophones include guitars; and bowed chordophones include violins.

Pianofortes, commonly referred to as pianos, have keyboards comprising different keys which are triggered to generate a range of musical notes. When the keys of the keyboard are depressed, up to three different strings are simultaneously struck with hammers to induce vibration of the strings resulting in production of a sound. When the key is released, the hammers move away from the strings and dampers are applied to the opposite side of the strings to stop the vibration.

The strings of a piano are made of piano wire, often manufactured from iron or high-carbon steel. Qualities of the strings, such as the length, tension and thickness all affect the sound produced when vibration of the strings is triggered by means of the hammers. In order to alter the pitch of the sound made by the string, and to keep the piano in tune, the tension of these strings must be adjusted periodically. At one end of each string, the string is wound around a tuning pin. These tuning pins are fixed into a pinboard and can be rotated to alter the tension of the strings and thereby the pitch of the sound made by the strings when vibration is induced.

When a piano tuner tunes a piano, they must gauge in which strings the tension requires altering, typically by listening for out of tune notes or by detecting out of tune notes by an electronic tuner. Once the strings that require alteration of tension have been identified, a tuning lever (a piano lever in the case of a piano) is fitted to the protruding end of the corresponding tuning pin and is used as a lever to rotate the tuning pin in the appropriate direction to either loosen or tighten the corresponding string attached to that tuning pin. Whilst the tuning pin is being rotated by the piano tuner using the tuning lever, the piano key associated with string in question is played until the string has the desired pitch. The tuning lever is then removed from the piano pin leaving the piano pin in a position such that the desired tension is imparted to the string.

Piano tuning pins are situated in a board of hard wood often referred to as the "pinblock". The pinblock holds the tuning pins in place and the friction between the tuning pins and the pinblock generally prevents the tuning pins from moving keeping the strings at a desired tension. Over time, the holes in the pinblock in which the tuning pins are located can become enlarged. This is due to repeated movement of the tuning pin in the pinblock during tuning and warping of the wood that the pinblock is made from due to changes in temperature and exposure to moisture/humidity. Such enlargement also sometimes occurs on a new piano when a tuning pin is warped.

As a tight fit of the tuning pin in the pinblock is necessary for holding a tuning pin in place to maintain the required tension in the string, enlarged pinblock holes cause the instrument to "de-tune" more rapidly than normal. Specifically, when the friction between the pinblock and the pin becomes weaker than the tension in the string, the tension in the string can result in the rotation of the tuning pin in the pinblock, in turn causing the attached string to loosen.

Moreover, enlarged pinblock holes make it more difficult to tune a piano. As described above, during tuning, a piano tuning pin is rotated with a tuning lever to achieve the desired tension in the string. However, when the desired tension has been applied via the tuning lever, as soon as the tuning lever has been removed, piano pins situated in enlarged holes have a tendency to move due to the friction between the pinblock and the pin not being sufficient to overcome the force imparted on the pin by the tension in the string, thereby immediately detuning the string being tuned.

Several solutions to this problem exist to inhibit the movement of tuning pins in pinblock holes. In one such solution, the loose tuning pin is removed from the hole in the pinblock and fitted with a sheath. The addition of the sheath to the tuning pin enlarges the effective circumference of the tuning pin, ensuring that the tuning pin has a tighter fit in the hole in the pinblock when reinserted. This solution requires that the tuning pin, once fitted with the sheath, be hammered back into the pinblock. This is often undesirable, particularly when tuning antique or valuable instruments as the hammering can cause unintentional damage to the instrument. The vibrations caused by hammering in the tuning pin can also cause other tuning pins to move within the pinblock and result in the unwanted alteration of tension in other strings. The unwanted alteration of the tension of these strings subsequently needs to be corrected. This can be very time consuming if a loose tuning pin is only identified partway through the tuning process as the whole tuning process may have to begin again.

An alternative solution to inhibit the movement of tuning pins is the application of a liquid treatment to the pinblock. The liquid treatment causes the wood surrounding the hole in the pinblock to expand resulting in tighter fit between the tuning pin and the hole in the pinblock when the tuning pin is reapplied to the pinblock. This solution is not always appropriate, particularly when dealing with antique and valuable instruments as it may result in permanent, and undesirable changes to the way instrument sounds. This solution often also entails hammering of the tuning pin into the pinblock following the application of the liquid, resulting in the same problems as outlined above.

It is an aim of certain embodiments of the invention to mitigate the above problems by providing a tool for use during tuning of an instrument such as a piano that inhibits movement of tuning pins that are fitted in loose pin block holes and that at least partly overcomes the problems set out above.

The tool is named "Pin-Gripper".

SUMMARY OF THE INVENTION

In accordance with a first aspect of the invention, there is provided a tool for fitting to a tuning pin of an instrument for inhibiting movement of the tuning pin. The tool comprises a tuning pin engaging portion comprising a through hole for engaging a tuning pin and one or more flexible resilient arms extending from the tuning pin engaging portion. The one or more flexible resilient arms configured, in use, to engage with other tuning pins adjacent to the tuning pin, and/or with the strings attached thereto, to inhibit movement of the tuning pin.

Optionally, the through hole is configured to engage with a piano tuning pin.

Optionally, the tool comprises a plurality of flexible resilient arms.

Optionally, the plurality of arms comprises at least two flexible resilient arms.

Optionally, each flexible resilient arm comprises a hook, each hook configured, in use, to engage with an adjacent string attached to an adjacent tuning pin.

Optionally, each flexible resilient arm comprises a resilient bend configured to engage with an adjacent tuning pin.

Optionally, each hook is tilted up from a plane of the flexible resilient arm.

Optionally, a first flexible resilient arm is a first length, and a second flexible resilient arm is a second length, said second length longer than the first length, the hook of said first flexible resilient arm configured, in use, to engage with a first string attached to the tuning pin to which the tool is engaged, and a said second string configured to engage with a second string attached to an adjacent tuning pin.

Optionally, the first flexible resilient arm is substantially 4 cm in length and the second flexible resilient arm is substantially 8 cm in length.

Optionally, the tuning pin engaging portion is provided by at least one coil of wire.

Optionally, the tuning pin engaging portion and plurality of flexible resilient arms are formed from a single length of wire.

Optionally, the through hole is tapered.

Optionally, the through hole has a substantially square, hexagonal, circular, or elliptical cross-section.

Optionally, the through hole is configured such that when fitted to a tuning pin, a suitable length of the tuning pin protrudes from the tool to allow a tuning lever to engage with the protruding section of the tuning pin.

Optionally, the flexible resilient arms further comprise a coiled region.

Optionally, the tuning pin engaging portion is formed from a main body and the flexible resilient arms extend outwards from the main body.

Optionally, a recess is provided surrounding the through hole on the tuning pin engaging portion configured to receive an insert, said insert comprising a further through hole for receiving a tuning pin.

Optionally, the tuning pin engaging portion further comprises grip screw extending into the through hole.

Optionally, the tuning pin engaging portion and plurality of flexible resilient arms comprise two single lengths of wire Optionally, the tuning pin tool further comprises a stabilising member.

Optionally, the stabilising member comprises: a plate having a central hole configured to receive a tuning pin and; at least one attachment means for attaching the stabilising member to the tuning pin tool.

Optionally, the one or more flexible resilient arms comprise metal wire.

Optionally, the metal wire is copper wire.

In accordance with a second aspect of the invention, there is provided a method of tuning an instrument string of an instrument, said method comprising: fitting a tool according to the first aspect to a first tuning pin of the instrument; placing a tuning lever on the first tuning pin and tuning a string connected to the tuning pin; tuning the string with the tuning lever; positioning the one or more arms of the tool to engage with further tuning pins adjacent to the first tuning pin, and/or with the strings attached thereto, to inhibit movement of the tuning pin when the tuning lever is removed, and removing the tuning lever.

Optionally, the method further comprises fitting a positioning piece onto the tuning pin before the fitting of the tool wherein the tool is positioned on top of the positioning piece.

Optionally, the method further comprises fitting a sheath onto the tuning pin before the fitting of the tool wherein the through hole of the tuning pin is positioned over said sheath.

Optionally, the instrument is a piano.

Optionally, the method further comprises the step of positioning hooks located on the flexible resilient arms of the tuning pin tool over the strings attached to neighbouring tuning pins.

In accordance with embodiments of the invention, a tuning pin tool is provided for inhibiting movement of a tuning pin during and after it has been tuned, for example, with a tuning lever. Tuning pin tools in accordance with embodiments of the invention, comprise a portion configured to engage a tuning pin and one or more flexible resilient arms extending from this portion.

The arms are configured such that they can be positioned to engage with adjacent tuning pins and/or strings attached to these tuning pins such that they inhibit movement of the tuning pin arising, for example, due to the rotational force applied to the tuning pin due to the tension in the string not being overcome by friction between the tuning pin and the material in which the tuning pin is mounted.

Use of such tools provides a method of inhibiting the movement of tuning pins in a pinblock that arises due to enlarged pinblock holes. Such a method does not require the use of liquid treatments and does not require loose tuning pins to be hammered.

Advantageously, such tuning pin tools can be left in-situ in and instrument, thereby prolonging the time that the corresponding strings are likely to remain in tune.

Advantageously, in certain embodiments, the tool comprises a tapered through hole ensuring the tool can be tightly fitted to a tuning pin Various further features and aspects of the invention are defined in the claims.

BRIEF DESCRIPTION OF THE DRAWINGS

Embodiments of the present invention will now be described by way of example only with reference to the accompanying drawings where like parts are provided with corresponding reference numerals and in which.

DETAILED DESCRIPTION

Figure 1:
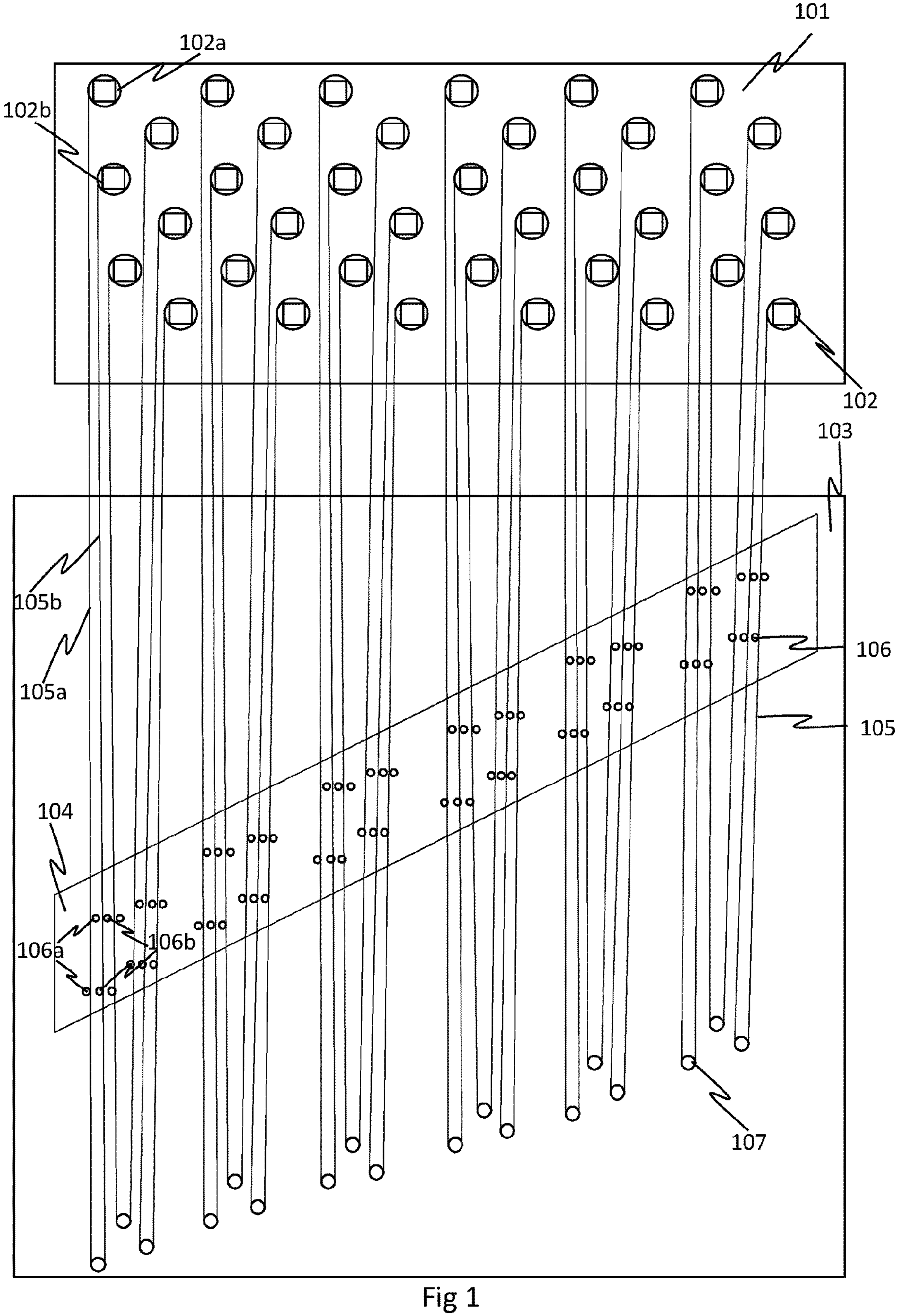
FIG. 1 provides a simplified schematic diagram of a part of a pinboard and sound board of a conventional piano.

FIG. 1 provides a simplified schematic diagram of a section of a pinblock 101 and soundboard 103 of a conventional piano. The skilled person will understand that FIG. 1 provides a simplified diagram of an example of part of a piano and therefore not all components which would typically be found in a conventional piano are shown in FIG. 1.

The pinblock 101 is typically situated behind a cast iron plate in an upright piano or underneath a cast iron plate in a grand piano. Tuning pins 102 are inserted in corresponding holes in the pinblock 101. Friction between the tuning pins 102 and the holes in which they are inserted generally inhibits movement of the tuning pins 102 unless manipulated with a tuning lever.

Typically, the pinblock 101 of a piano is manufactured from multiple layers of cross-laminated hardwood that has been glued and compressed. The holes in the pinblock are typically configured to have a slightly smaller diameter than that of the tuning pin 102 to be inserted into the hole to ensure a tight fit.

Piano tuning pins 102 are typically manufactured from steel and are substantially cylindrical at one end and have a substantially square or hexagonal cross-section at the opposite end shaped to be engaged by a tuning lever.

The substantially cylindrical end of a tuning pin 102 is typically at least partially threaded and is inserted into a hole in a pinblock 101. Threading on the substantially cylindrical end of the tuning pin further increases the friction between the tuning pin 102 and the hole in the pinblock 101. Piano strings are typically fitted to a piano relative to the orientation of the threading so that rotation of a tuning pin to tighten the string drives the tuning pin further into the pinboard.

The opposite end of the tuning pin 102 with the square or hexagonal cross-section protrudes out of the pinblock 101 and is such that it can be engaged by a tuning lever. In the middle of the tuning pin 102 there is a small through hole through which piano wire is threaded.

The soundboard 103 is a large thin wooden board typically constructed from multiple strips of wood that have been glued together. The soundboard 103 holds the bridge 104 which is also typically constructed from multiple layers of cross-laminated hardwood that has been glued and compressed. The soundboard 103 acts as an amplifier of the sound and the role of the bridge 104 is to connect the source of the sound (the strings 105) to the amplifier (the soundboard 103).

On the bridge 104, are multiple bridge pins 106. The bridge pins are small metal pins which hold the strings 105 in position on the bridge. Each string 105 is held in place by two bridge pins 106. The soundboard 103 also holds multiple hitch pins 107, the hitch pins 107 hold the strings at the distal end.

Piano strings are made from piano wire. To fit a string to a piano, first a length of piano wire is inserted through the tuning pin through hole. The piano wire is then coiled around the tuning pin two or three times and a protruding end of piano wire is bent inwards thereby holding it in place.

The fitting of a piano string is explained further with reference to FIG. 1.

A string 105*a*, once threaded through a tuning pin 102*a*, is then extended over the sound bridge 104, where it is held in place by being inserted between a first pair of bridge pins 106*a*. The piano wire is then bent around a hitch pin 107. The length of piano wire between the first tuning pin 102*a* and the hitch pin 107, forms a first string 105*a*. The piano wire then extends from the hitch pin 107 to a second tuning pin 102*b*, so as to form a second string 105*b*, running substantially in parallel with the first string 105*a*.

The length of piano wire forming the second string 105*b* also passes over the bridge 104 and between a second pair of bridge pins 106*b*. The length of piano wire forming the second string 105*b* terminates at a second tuning pin 102*b*, where the length of piano wire is inserted through a through hole in the second tuning pin 102*b* and coiled around the second tuning pin 102*b* so as to form two or three coils.

Once the strings are fitted in place in a piano they are tuned. To tune each string, a tuning lever is used to rotate the tuning pins 102 and thereby tighten or loosen the strings 105 to which the tuning pins 102 are attached. Rotation of a tuning pin 102 in a first direction results in the tightening of the corresponding string (and thus increasing the pitch produced when the string is played) and rotation of a tuning pin 102 in a second direction results in the loosening of the corresponding string (and thus decreasing the pitch produced when the string is played).

Figure 2A:
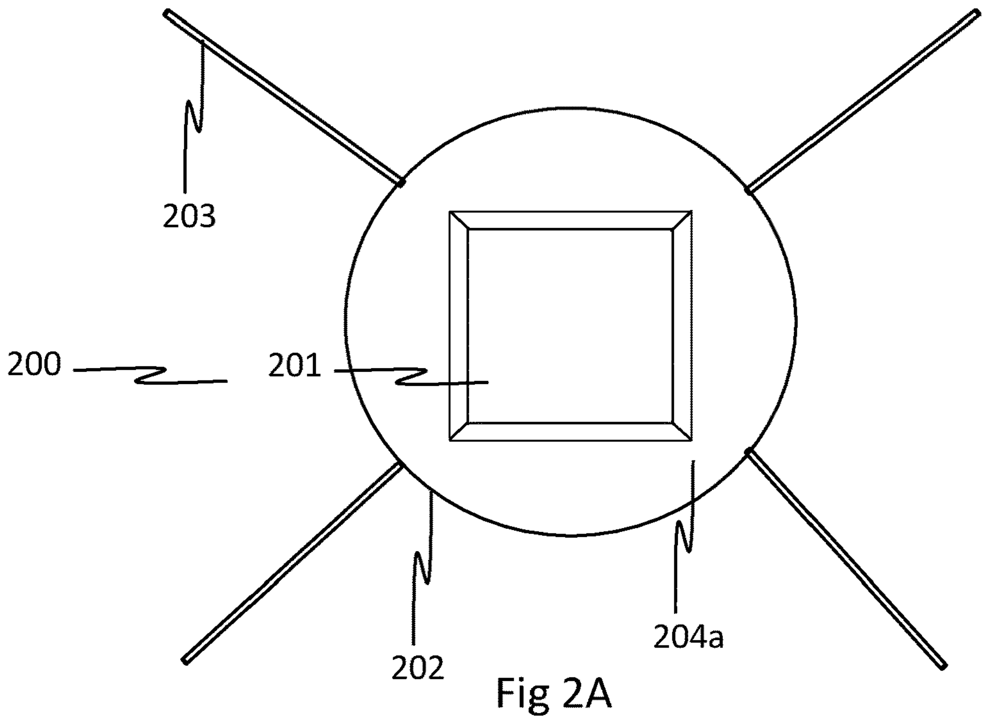
FIGS. 2*a* and 2*b* provide simplified schematic diagrams depicting a tuning pin tool in accordance with certain embodiments of the invention.
Figure 2B:
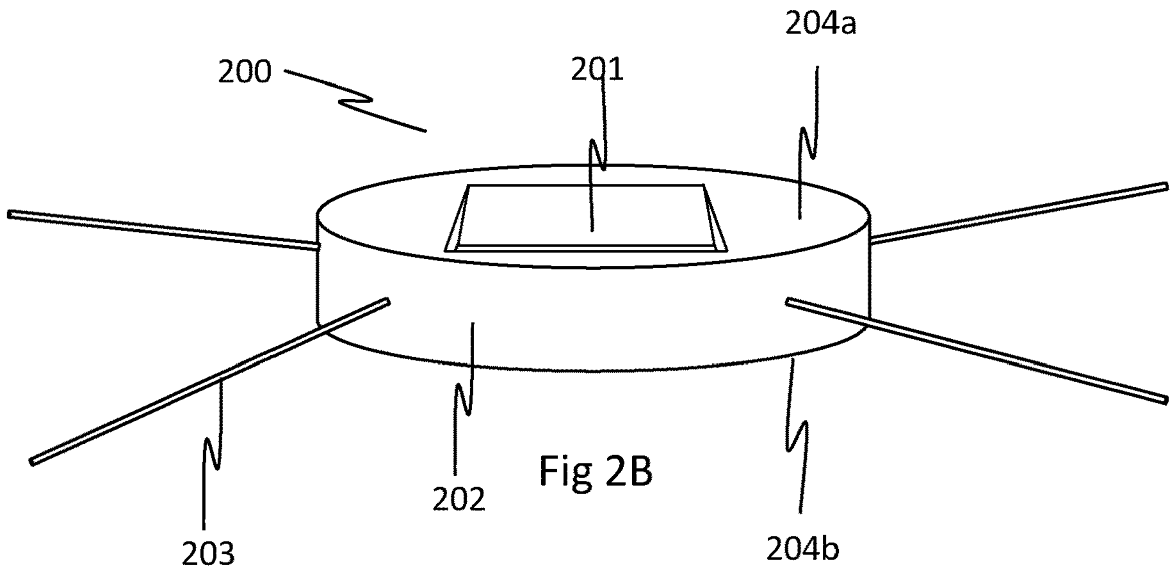

As described above, enlarged pinblock holes make it more difficult to tune a piano because once a tuning lever has been used to apply the desired tension to a piano string by rotating a tuning pin and the tuning lever is removed from the tuning pin, the tuning pin is prone to move, thereby detuning the string that has just been tuned. FIGS. 2*a* and 2*b* provide simplified schematic diagrams showing a tuning pin tool according to certain embodiments of the present invention which mitigate this problem.

FIG. 2*a* shows a top view of the tuning pin tool 200 and FIG. 2*b* shows an isometric view of the tuning pin tool 200.

The tuning pin tool 200 comprises a main body which forms a tuning pin engaging portion 202 which typically comprises a suitable material such as steel, brass, chrome, or hardened plastic.

The tuning pin engaging portion 202 shown in FIGS. 2*a* and 2*b* has a substantially disc-shaped configuration although can be any suitable shape, such as triangular, square, hexagonal, spherical etc.

In the embodiment depicted in FIGS. 2*a* and 2*b*, the diameter of the disc-shaped tuning pin engaging portion 202 is approximately 2.5 cm with a depth of approximately 0.3 cm.

Located centrally within the tuning pin engaging portion 202 is a through hole 201. The through hole 201 has a cross-section configured to receive the exposed portion of a piano tuning pin that has been inserted in a pinblock (the exposed portion being the portion that is engaged by the tuning lever).

In certain embodiments, the through-hole 201 is configured specially for tuning pins the exposed-in-use ends of which have a substantially square cross-section. In such embodiments, the through hole 201 has a cross-section that is substantially square.

Figure 2C:
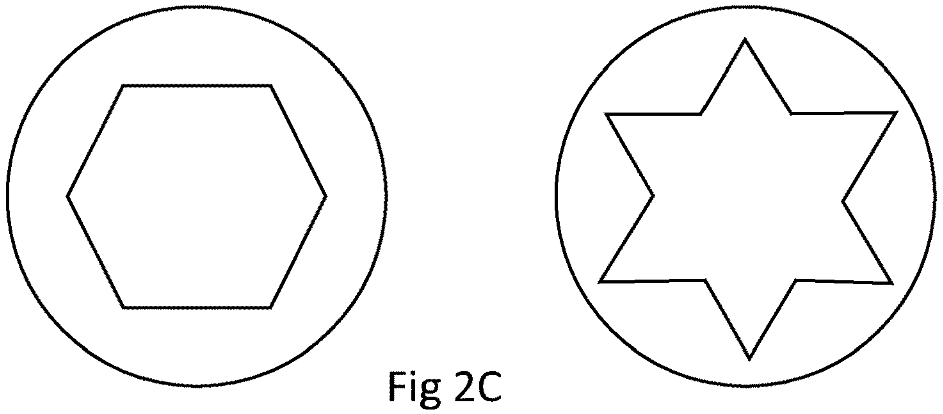
FIG. 2*c* provides a schematic diagram depicting alternative through-hole configurations of pin engaging portions in accordance with certain embodiments of the invention.

In other embodiments, for tuning pins that have a substantially hexagonal cross-section for the end that is exposed in use, the through hole has a cross-section that is substantially hexagonal. This is depicted schematically in FIG. 2*c*.

In further embodiments, the through hole may have a cross-section configured to engage with different types of tuning pins, e.g. tuning pins that have a substantially hexagonal cross-section or have a substantially square cross-section. Such a cross-section may be "star" shaped. This is depicted schematically in FIG. 2*c*.

The through hole 201 is typically sized so that its diameter allows it to fit over, and slide down, the exposed part of a tuning pin. The thickness of a typical tuning pin increases down its length as the cross-section changes from being configured to engage with a tuning lever (e.g. square or hexagonal) to circular. The through hole 201 is typically sized so that as it is pushed down the length of the piano pin, it will engage with the tuning pin as it gets thicker thereby resulting in a secure friction fit between the piano pin and the tool.

To aid the formation of this secure friction fit, the through-hole may be tapered slightly. That is, an aperture on one face of the tuning pin engaging portion 202 has an area larger slightly larger than the aperture on the opposite face of the tuning pin engaging portion 204*b*.

The tuning pin tool 200 further comprises a plurality of flexible resilient arms 203 extending outwards from the tuning pin engaging portion 202. The flexible resilient arms 203 are thin, elongate projections made from flexible resilient material such as copper wire or steel wire. The flexible resilient arms 203 can be attached to the tuning pin engaging portion 202 by any suitable technique, for example the flexible resilient arms 203 may be fixed to the tuning pin engaging portion 202 by means of soldering. Alternatively, the flexible resilient arms 203 may be fixed to the tuning pin engaging portion 202 by fitting into holes on the body of the tuning pin engaging portion 202. In another example, one length of flexible resilient material may extend through a hole in the body of the tuning pin engaging portion 202 forming two flexible resilient arms 203 protruding from opposite areas of the body of the tuning pin engaging portion 202.

Figure 3A:
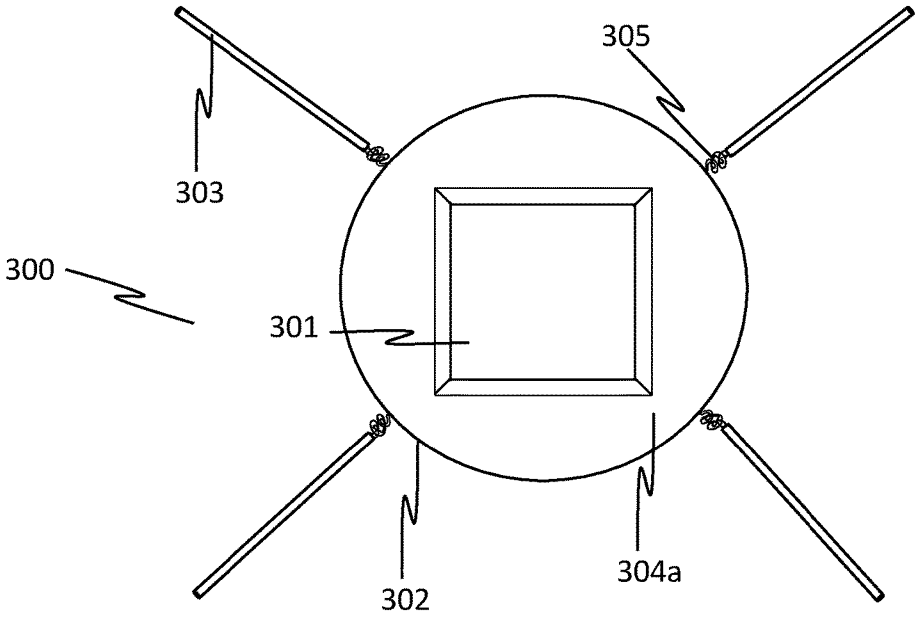
FIGS. 3*a* and 3*b* provide simplified schematic diagrams depicting a tuning pin tool in accordance with an alternative embodiment of the invention.
Figure 3B:
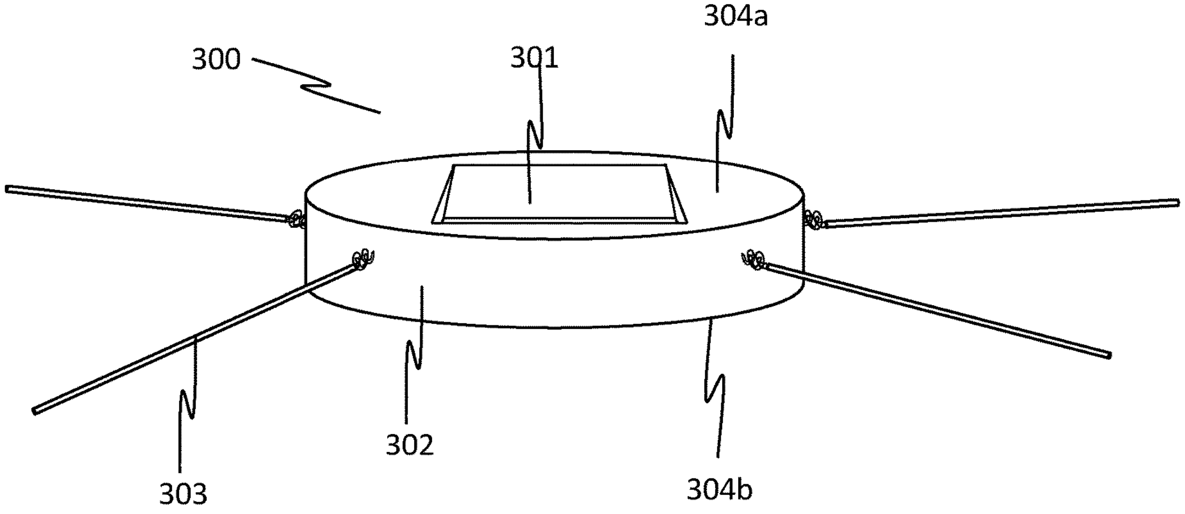

FIGS. 3*a* and 3*b* provide schematic diagram of a piano tuning pin tool according to certain embodiments of the invention. FIG. 3*a* shows a top view of the tuning pin tool 300 and FIG. 3*b* shows an isometric view of the tuning pin tool 300. As can be seen from FIGS. 3*a* and 3*b*, in certain embodiments, the flexible resilient arms 303 may further comprise a coiled region 305 located proximal to the tuning pin engaging portion 302. The coiled regions 305 may be formed as an integral part of the flexible resilient arms 303 by the coiling of the flexible resilient material from which the flexible resilient arms 303 are manufactured. Alternatively, the coiled regions 305 may be manufactured from a separate component which is fixed to the flexible resilient arms 303. The coiled regions 305 on the flexible resilient arms 303 confer additional resilience to the flexible resilient arms 303. The coiled region 305 is shown with gaps between the coils however in certain embodiments the coils may be more tightly wound and there may, for example, be no gaps between the coils of the coiled regions.

Figure 4A:
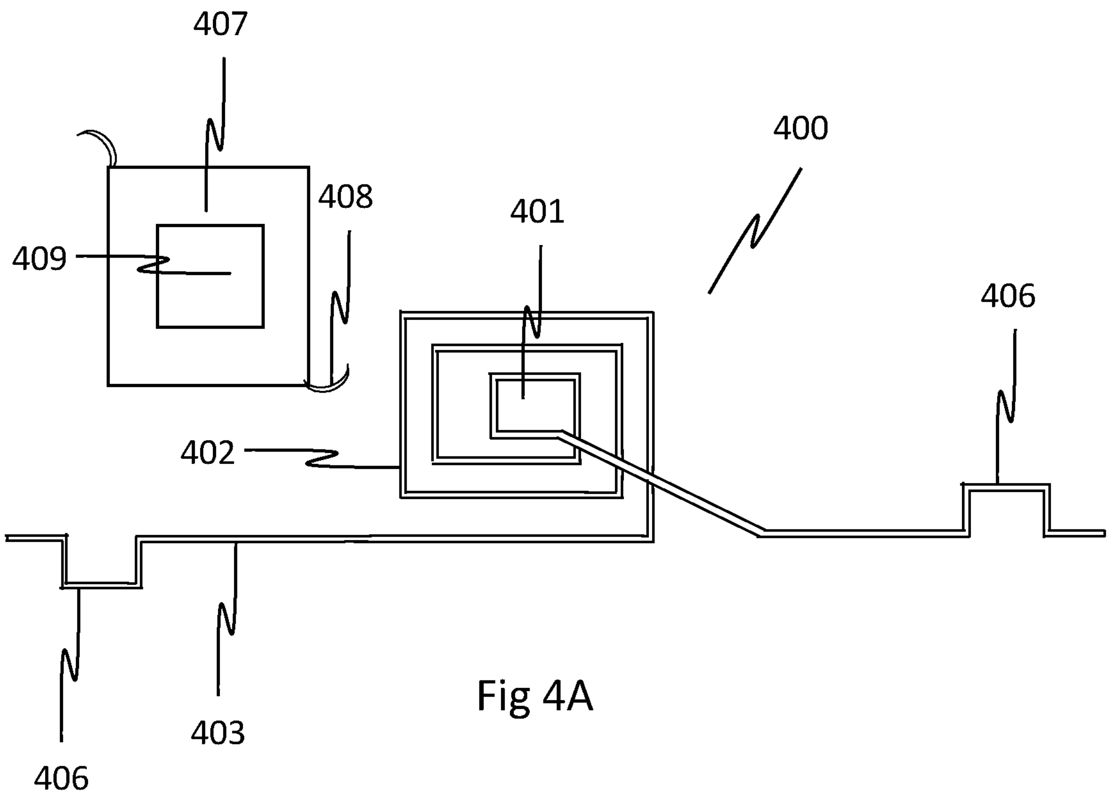
FIGS. 4*a* and 4*b* provide simplified schematic diagrams depicting a tuning pin tool in accordance with an alternative embodiment of the invention.
Figure 4B:
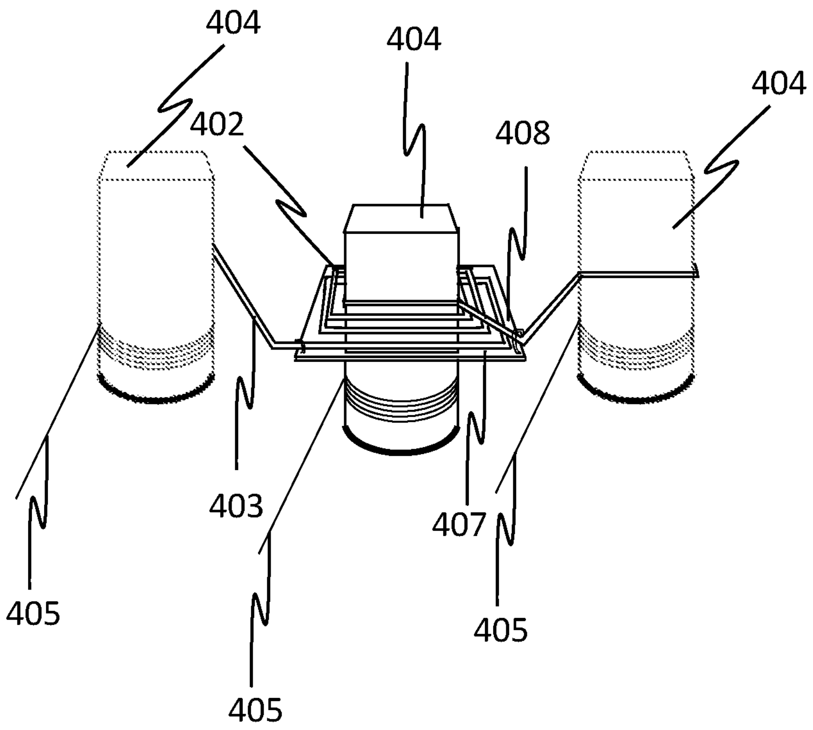

FIGS. 4*a* and 4*b* provide schematic diagrams of a piano tuning pin tool according to certain embodiments of the invention. FIG. 4*a* shows a tuning pin tool 400 comprised of a single piece of wire, for example metal wire. The tuning pin engaging portion 402 comprises a plurality of coils of the metal wire. The coils of metal wire on one end of the tuning pin engaging portion 402 have a larger perimeter at the coils of metal wire at the opposite end of the tuning pin engaging portion 402. The coils of metal wire are configured such that there is a through hole 401 in the centre for receiving the tuning pin. The through hole 401 is typically sized so that as it is pushed down the length of the tuning pin, it will engage with the tuning pin as it gets smaller thereby resulting in a secure fit between the piano pin and the tool.

The flexible resilient arms 403 are comprised of the two ends of the wire. Each flexible resilient arm 403 comprises a recess 406 configured to securely fit around a neighbouring piano pin.

In certain embodiments, the tuning pin tool 400 may be provided with a stabilising member 407. The stabilising member 407 may be a plate, for example a thin metal plate, with a central hole for receiving the tuning pin 409. The stabilising member has a means for attaching to the tuning pin tool such as attachment hooks 408.

FIG. 4*b* shows a tuning pin tool according to certain embodiments of the invention fitted to a tuning pin. Prior to fitting the tuning pin tool, the stabilising member is fitted to the tuning pin such that the tuning pin extends through the central hole 409 of the stabilising member 407. The tuning pin tool is fitted over the tuning pin 404 such that the through hole 401 in the tuning pin engaging portion 402 is fitted over the tuning pin 404 and pushed down until a secure fit is achieved between the smaller coils of the tuning pin engaging portion 402 and the tuning pin. The flexible resilient arms are positioned on neighbouring tuning pins such that they reduce the rotational force acting on the tuning pin 404 by virtue of the piano string 405. The recess portion 406 of the flexible resilient arms 403 is arranged such that the neighbouring tuning pin fits within it. The attachment hooks 408 of the stabilising member are then hooked over the wire of the tuning pin tool to prevent rotational torsion of the tool.

In certain embodiments, a plurality of tuning pin tools 400 may be fitted to a single tuning pin 400.

Figure 5A:
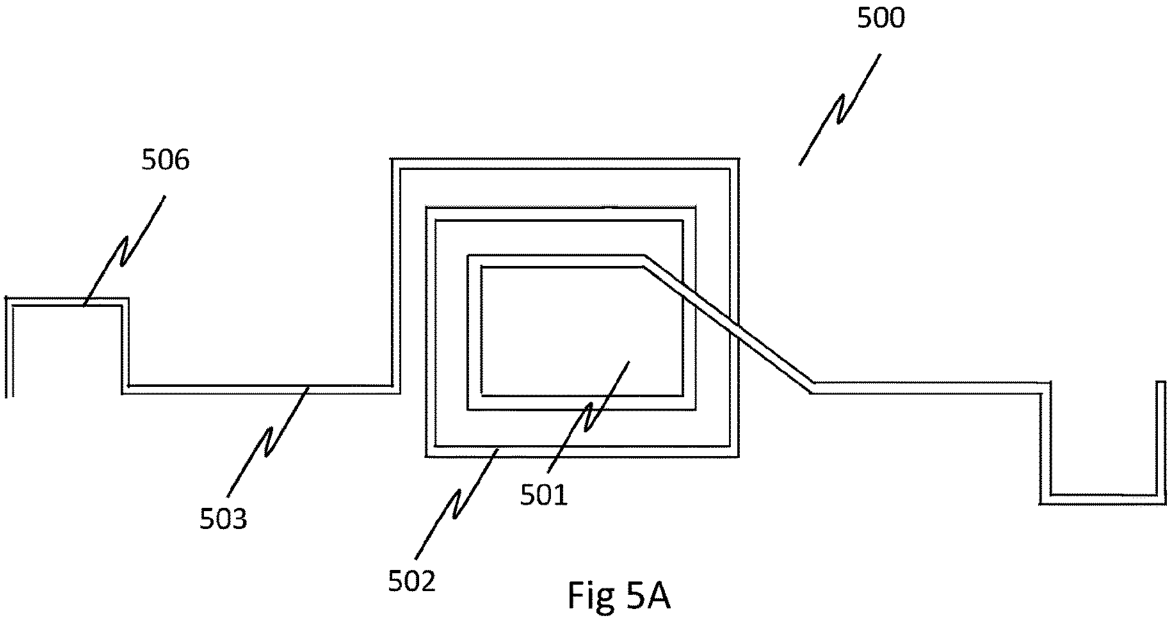
FIGS. 5*a* and 5*b* provide simplified schematic diagrams depicting a tuning pin tool in accordance with an alternative embodiment of the invention.
Figure 5B:
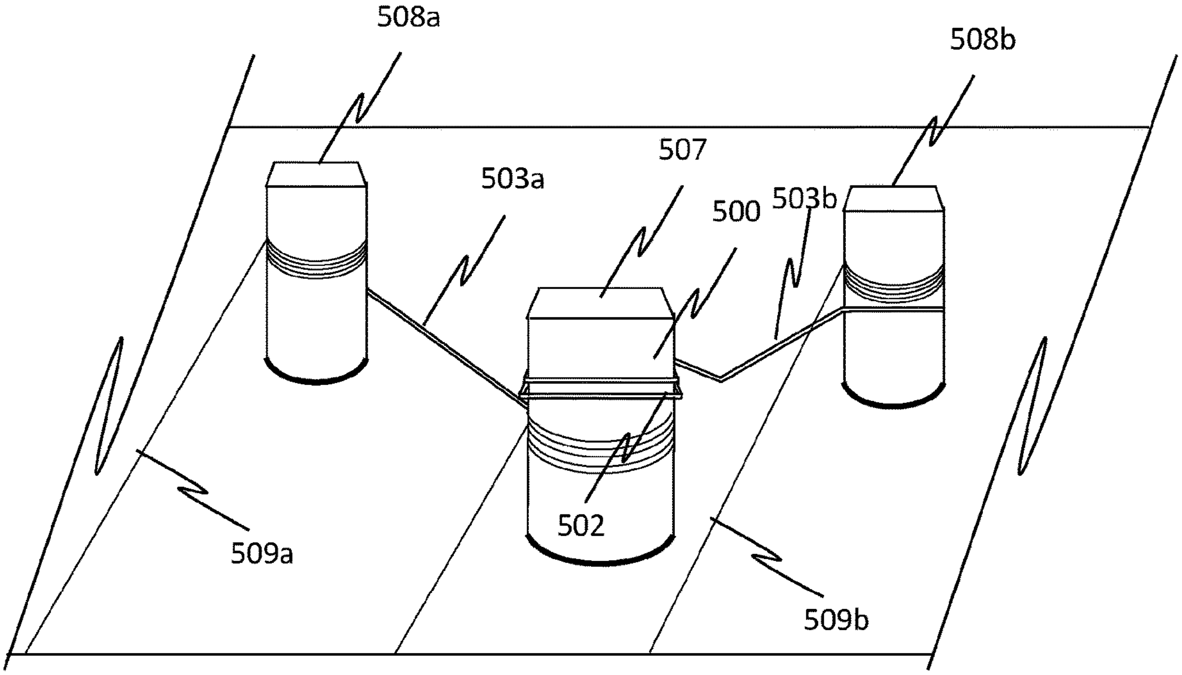

FIGS. 5*a* and 5*b* provide schematic diagram of a piano tuning pin tool according to certain embodiments of the invention. FIG. 5*a* shows a tuning pin tool 500 comprised of a single piece of wire as shown in FIG. 4*a*. The tuning pin tool comprises a single piece of coiled wire forming a tuning pin engaging portion 502 and a through hole 501 for receiving the tuning pin.

The flexible resilient arms 503 are formed from the two ends of the wire and each further form a recess 506, configured to fit to a neighbouring tuning pin. The tuning pin tool 500 is not provided with a stabilising member.

FIG. 5*b* shows a tuning pin tool according to certain embodiments of the invention fitted to a tuning pin. The tuning pin engaging portion 502 of the tool is fitted to the tuning pin 507, the tuning pin 507 extends through the through hole of the tuning pin engaging portion 502. The flexible resilient arms 503*a*, 503*b* are positioned to interact with neighbouring tuning pins 508*a*, 508*b* such that the recess in the flexible resilient arms 503*a*, 503*b* fits around the neighbouring tuning pins 508*a*, 508*b*. The flexible resilient arms are positioned under the string 509*a*, 509*b* on the neighbouring tuning pins 508*a*, 508*b* such that the string 509*a*, 509*b* prevents the flexible resilient arms 503*a*, 503*b* slipping off the neighbouring tuning pins 508*a*, 508*b*.

Figure 6A:
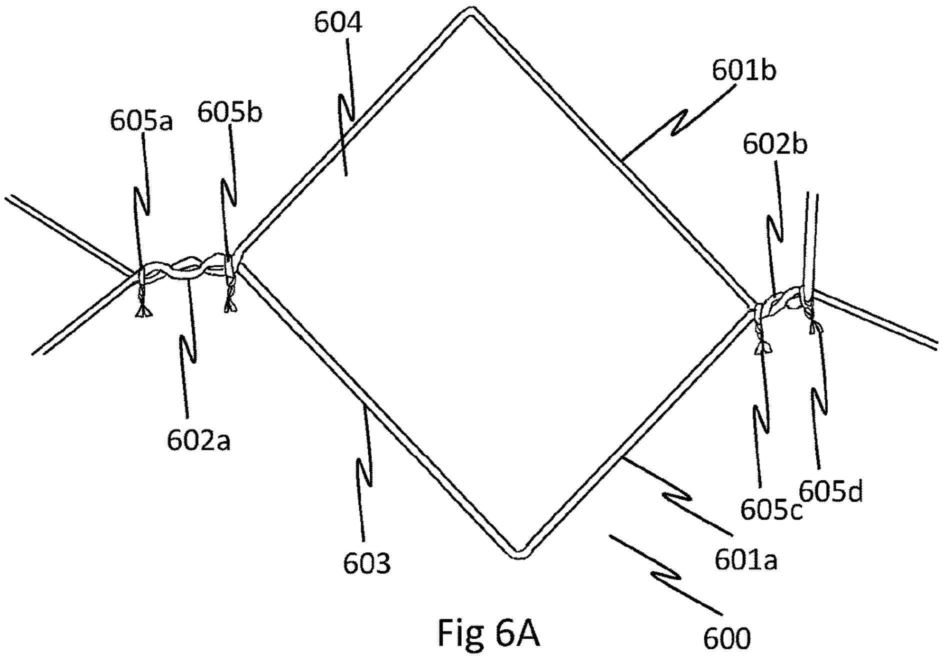
FIGS. 6*a* and 6*b* provide simplified schematic diagrams depicting a tuning pin tool in accordance with an alternative embodiment of the invention.
Figure 6B:
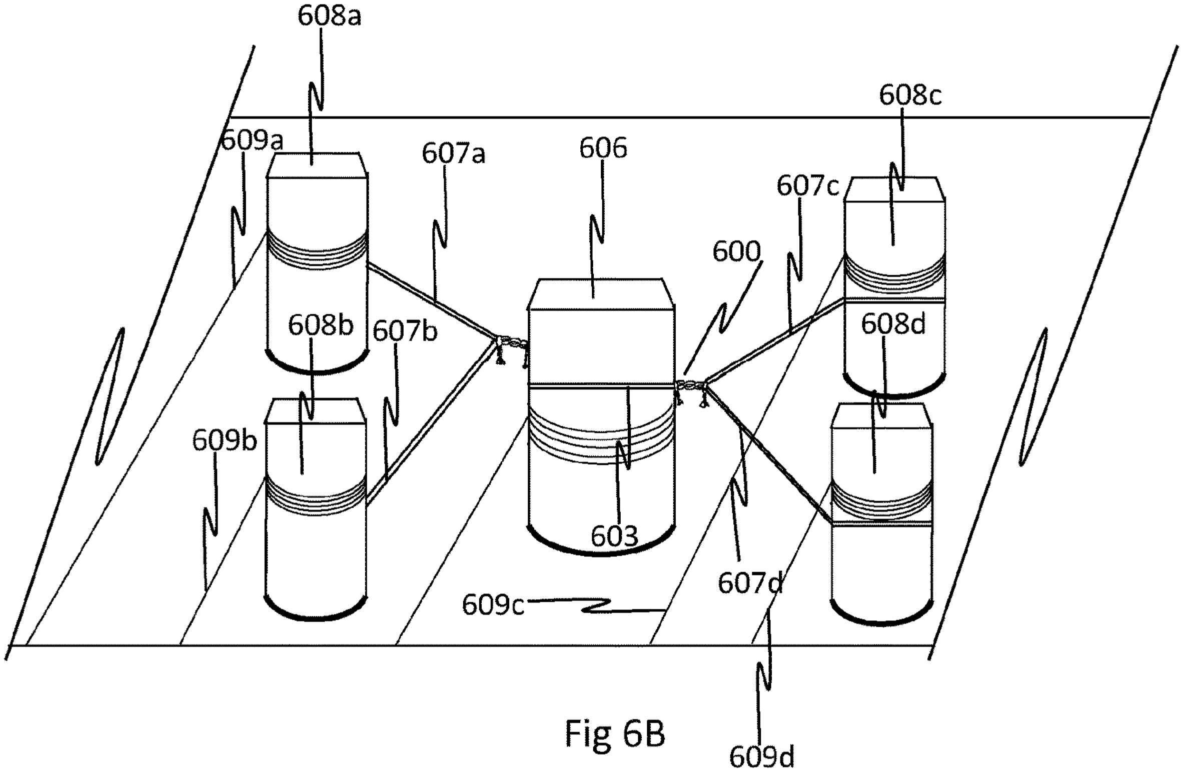

FIGS. 6*a* and 6*b* provide schematic diagram of a piano tuning pin tool according to certain embodiments of the invention. FIG. 6*a* shows a tuning pin tool 600 comprised of two lengths of wire 601*a*, 601*b*. The two pieces of wire 601*a*, 601*b* are connected at two connection points 602*a*, 602*b*, where they are connected by being wound together. In between the two connection points 602*a*, 602*b*, the two lengths of wire 601*a*, 601*b* are configured to form a tuning pin engaging portion 603 with a through hole 604 for receiving a tuning pin.

The first connecting point 602*a* further comprises two securing grips 605*a*, 605*b*, formed from a length of wire reaching around the connecting point 602*a* and wound together to secure the connecting point 602*a*. The second connecting point 602*b* also comprises two corresponding securing grips 605*c*, 605*d*.

FIG. 6*b* shows a tuning pin tool according to certain embodiments of the invention fitted to a tuning pin. The tuning pin tool 600 is fitted to the tuning pin 606, the tuning pin 606 extends through the through hole of the tuning pin engaging portion 603. The flexible resilient arms 607*a*, 607*b*, 607*c*, 607*d* are positioned to engage with neighbouring tuning pins 608*a*, 608*b*, 608*c*, 608*d* such that they are positioned below the string to prevent the flexible resilient arms 607*a*, 607*b*, 607*c*, 607*d* slipping off the neighbouring tuning pins 608*a*, 608*b*, 608*c*, 608*d* when the tuning pin tool 600 is in place.

The tuning pin tool shown in FIGS. 6*a* and 6*b* is depicted having two lengths of wire of substantially the same length and width. However, in certain embodiments the tuning pin tool may comprise lengths of wire having different lengths or widths.

Figure 7:
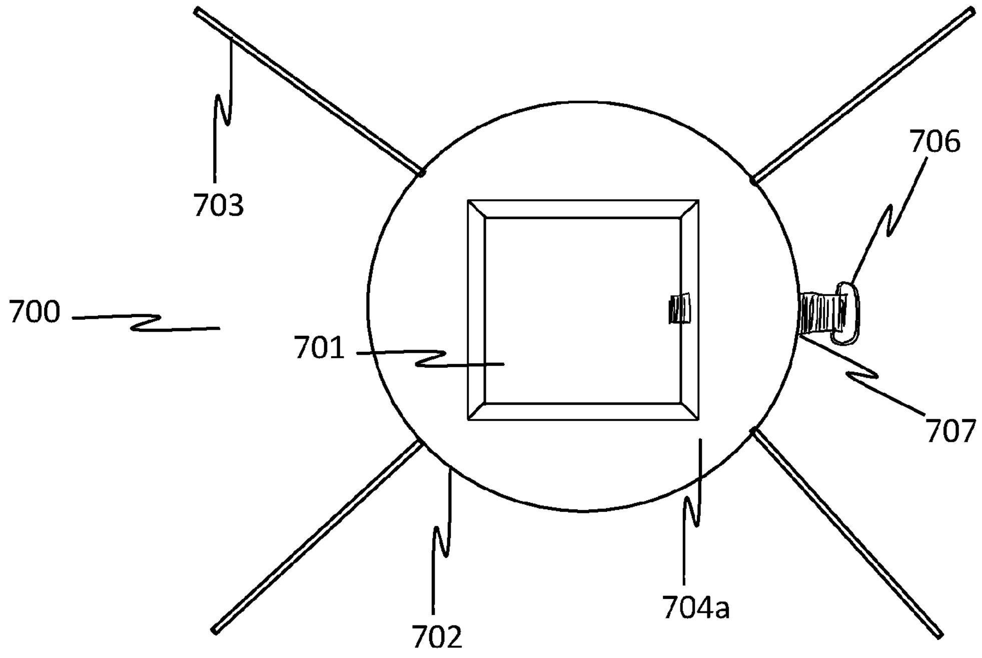
FIG. 7 provides a simplified schematic diagram depicting a tuning pin tool in accordance with an alternative embodiment of the invention.

FIG. 7 provides schematic diagram a piano tuning pin tool in accordance with certain embodiments of the invention. The tuning pin tool 700 is fitted with a grip screw 706 which can be rotated to provide a tighter fit between the tuning pin tool 700 and tuning pin when the tuning pin tool 700 is in place on the tuning pin. The grip screw 706 comprises a threaded shaft which is inserted into an internally threaded hole 707 on the tuning pin engaging portion 702.

When in use, the tuning pin tool 700 is fitted over a tuning pin with the grip screw 706 positioned so that it does not extend into the through hole 701 of the pin engaging portion 702. When the tuning pin tool 700 is correctly positioned on the tuning pin. The grip screw 706 is then rotated in the internally threaded hole 707 such that the grip screw 706 extends into the through hole 701 of the tuning pin engaging portion 702 until it contacts the tuning pin. In this way, the grip screw 706 is urged against the tuning pin such that a secure fit between the tuning pin and the tuning pin engaging portion 702 is provided.

Figure 8:
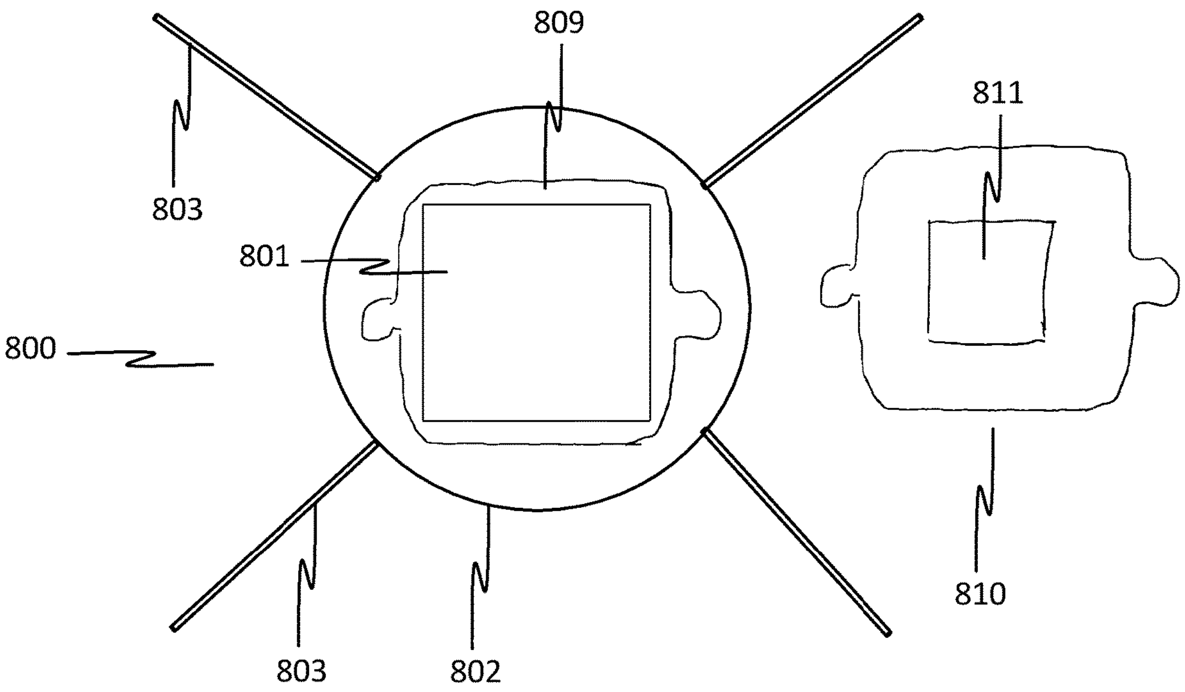
FIG. 8 provides a simplified schematic diagram depicting a tuning pin tool in accordance with an alternative embodiment of the invention.
Figure 8:
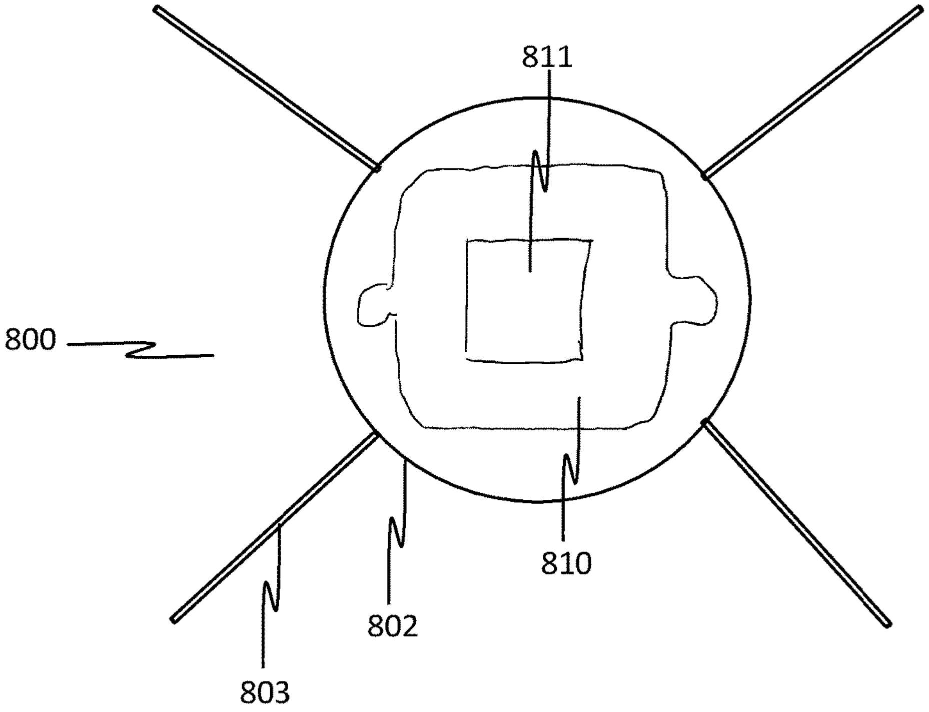

FIG. 8 provides schematic diagram a piano tuning pin tool according to certain embodiments of the invention. As can be seen in FIG. 8, a tuning pin tool 800 is provided with a recess 809 surrounding the through hole 801 in the pin engaging portion 802. A separate insert 810 is provided having a shape complimentary to the recess 809 on the pin engaging portion. The insert 810 further comprises a through hole 811 configured to receive a tuning pin. In certain embodiments, different inserts are provided with through holes of different shapes and sizes configured to receive a range of different tuning pins. The insert 810 can be made from any suitable material, for example the insert may be manufactured from the same material as the tuning pin engaging portion 802 or alternatively the insert 810 may be manufactured from a different material such as plastic.

In use, the insert 810 is positioned in the recess 809 on the tuning pin engaging portion 802. The tuning pin tool 800 and insert 810 are then positioned on the tuning pin such that, the face of the tuning pin engaging portion 802 holding the insert is placed over the tuning pin first (i.e. faces towards the pinboard). The insert 810 is configured to fit tightly into the recess 809 on the tuning pin engaging portion 802 such that it will not readily separate from the tuning pin engaging portion 802 when it is positioned over the tuning pin.

Figure 9A:
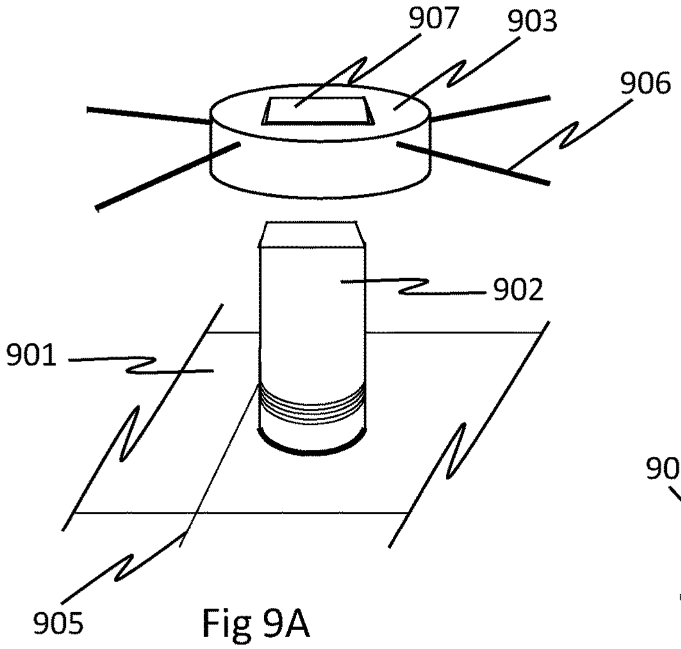
FIGS. 9*a*, 9*b* and 9*c* provide schematic diagrams depicting steps of a piano string tuning process using a tuning pin tool in accordance with certain embodiments of the invention.
Figure 9B:
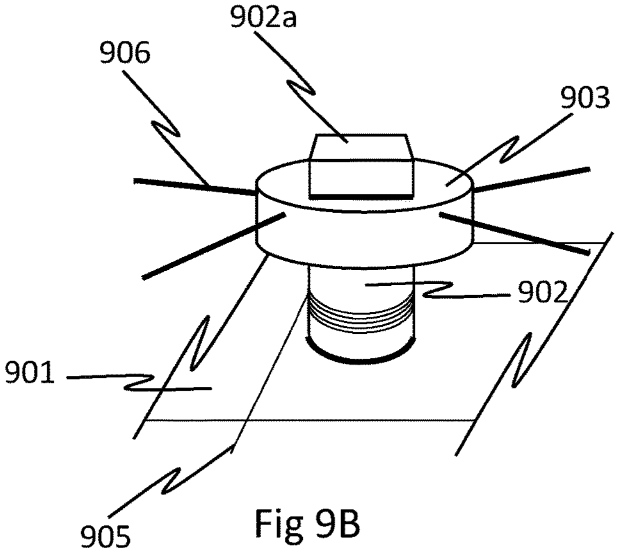
Figure 9C:
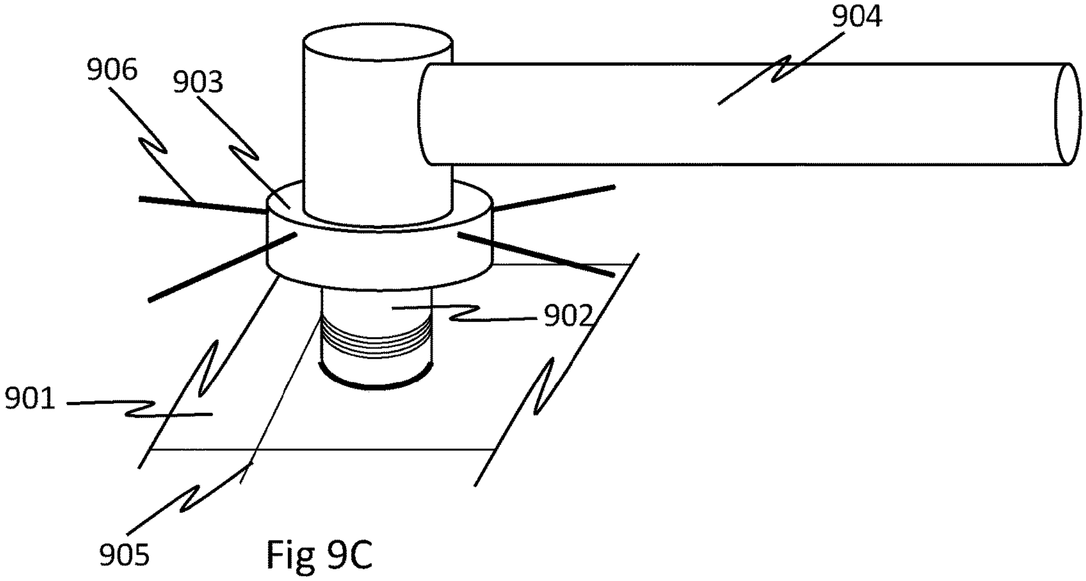

FIGS. 9*a*, 9*b* and 9*c* provide a schematic diagram depicting how tools in accordance with embodiments of the invention are used during an instrument tuning process.

A section of a pinboard 901 is shown in which a tuning pin 902 is inserted and which is attached to a piano string 905 as described above.

During a typical tuning process, a piano tuner will identify tuning pins that are loose within the pin block. This is usually done by feeling or tapping each tuning pin.

If the piano tuner identifies that the tuning pin 902 is loose, as shown in FIGS. 9*a* and 9*b*, a tuning pin tool 903, arranged in accordance with embodiments of the invention, is slid over the tuning pin 902 such that a top part of the tuning pin 902*a* protrudes above the tool 903. As shown in FIG. 9*c*, a tuning lever 904 is then placed over the tuning pin 902 to engage the top part of the tuning pin 902*a*. Downward pressure is then applied to the tuning pin tool 903 via the tuning lever 904 which forces the tool 903 down onto the tuning pin 902, and, due to the tapered configuration of the through-hole 907 of the tuning pin tool 903, the tuning pin tool 903 is fixed in place on the tuning pin 902.

The piano tuner then turns the tuning lever 904 to rotate the tuning pin 902 to change the tension in the piano string 905 so that the piano string 905 generates the desired pitch when played.

When this has been done, to ensure that the tuning pin does not change position when the tuning lever 904 is removed, the piano tuner positions the flexible resilient arms 906 of the tuning pin tool 903 so that they engage with the protruding parts of adjacent tuning pins. The piano tuner can readily position the flexible resilient arms 906 because the arms 906 are flexible and resilient. Typically, the flexible resilient arms are appropriately positioned so that they impart a force on the tuning pin tool that inhibits rotational movement of the tuning pin engaging portion of the tool in a given direction. Typically, this is in the opposite direction to the rotational force imparted on the tuning pin due to tension in the piano string.

Accordingly, when the tuning lever 904 is removed, even if the through hole 907 in which the tuning pin 902 is inserted has become enlarged, rotational movement of the tuning pin 902 is inhibited thereby reducing the chance that the piano string 905 de-tunes.

In certain embodiments of the present invention, a positioning piece may be fitted to the tuning pin before the tuning pin tool to ensure the tuning pin tool is positioned on the tuning pin such that it will not come into contact with the piano string. FIGS. 10*a*, 10*b*, 10*c* and 10*d* provide a schematic diagram depicting how a positioning piece in accordance with certain embodiments of the invention is used with a tuning pin tool during an instrument tuning process.

Figure 10A:
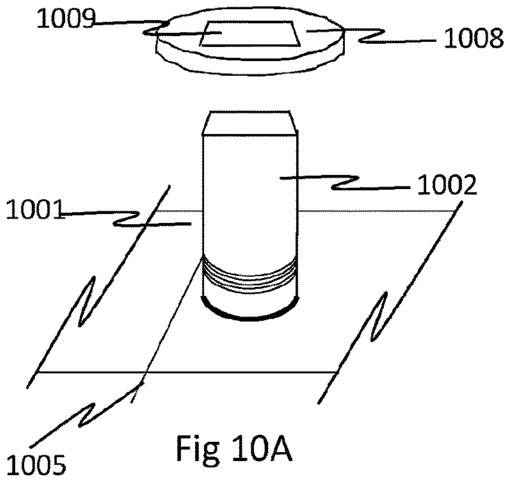
FIGS. 10*a*, 10*b*, 10*c* and 10*d* provide schematic diagrams depicting steps of a piano string tuning process using a tuning pin tool in accordance with alternative embodiments of the invention.

A section of a pinboard 1001 is shown in which a tuning pin 1002 is inserted and which is attached to a piano string 1005 as described above. In FIG. 10*a*, a positioning piece 1008 is also shown comprising a through hole 1009 configured to receive a tuning pin.

Figure 10B:
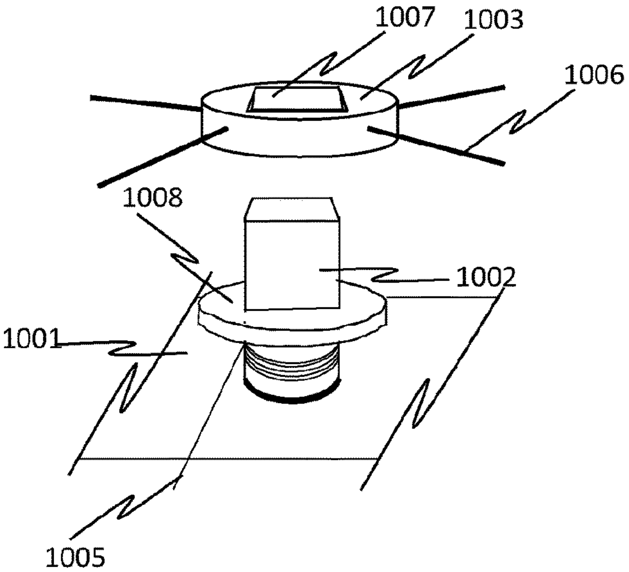

FIG. 10*b* shows a tuning pin 1002 on which a positioning piece 1008 has been placed such that the tuning pin 1002 extends through the through hole 1009 of the positioning piece 1008.

Figure 10C:
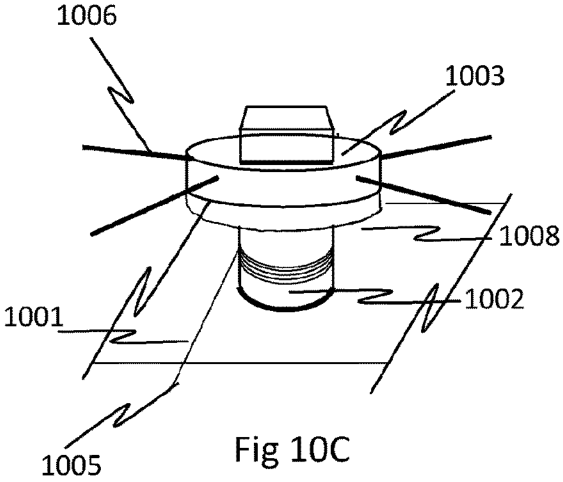

FIG. 10*c* shows a tuning pin 1002 on which a positioning piece 1008 and a tuning pin tool 1003 have been positioned such that the tuning pin tool 1003 is placed on top of the positioning piece 1008 and the tuning pin 1002 extends through the through hole in the positioning piece 1008 and the through hole in the tuning pin tool 1003.

Figure 10D:
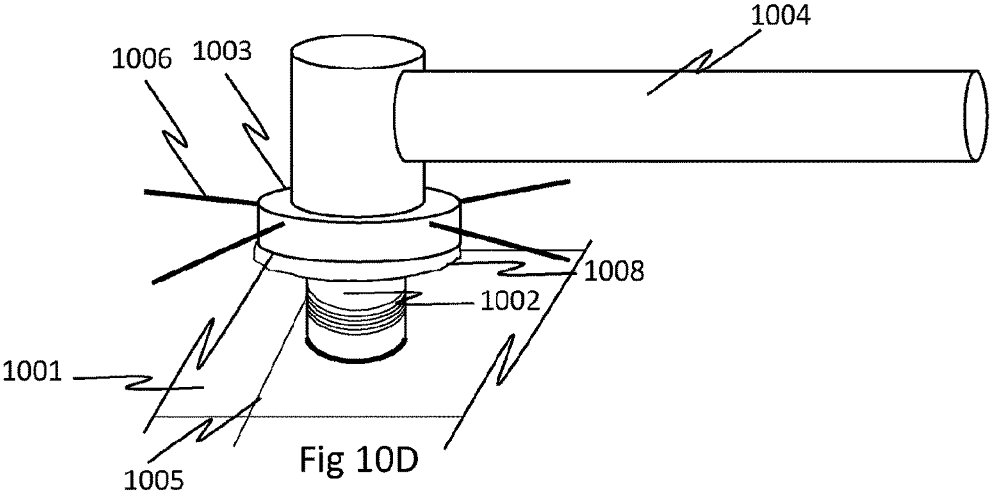

FIG. 10*d* shows the tuning pin tool 1003 and positioning piece 1008 in place on a tuning pin 1002 onto which a tuning lever is fitted. The positioning piece 1008 allows the tuning pin tool 1003 to be positioned in an optimal place on the tuning pin 1002 so that it does not come into contact with the piano string 1005 and permits a sufficient length of the tuning pin 1002 to protrude from the top of the tuning pin tool 1003 so that a tuning lever 1004 can be fitted to the tuning pin 1002. The size of through hole 1009 of the positioning piece 1008 is configured such that it is smaller than the tuning pin 1002 at the point which the piano string 1005 is attached, this means that when the positioning piece 1008 is being placed onto the tuning pin 1002, it will stop at a position above the piano string 1005 and thereby prevent the piano tool from coming into contact with the piano string 1005.

In certain embodiments of the present invention, a sheath may be fitted to the tuning pin before the tuning pin tool to ensure the tuning pin tool is positioned on the tuning pin such that the tuning pin tool does not contact the strings. In certain embodiments where a tuning pin is substantially narrower than the through hole in the tuning pin engaging portion, a sheath may be fitted to the tuning pin such that a tighter fit is provided between the tuning pin and the tuning pin tool. FIGS. 11*a*, 11*b*, 11*c* and 11*d* provide a schematic diagram depicting how a sheath in accordance with certain embodiments of the invention is used with a tuning pin tool during an instrument tuning process.

Figure 11A:
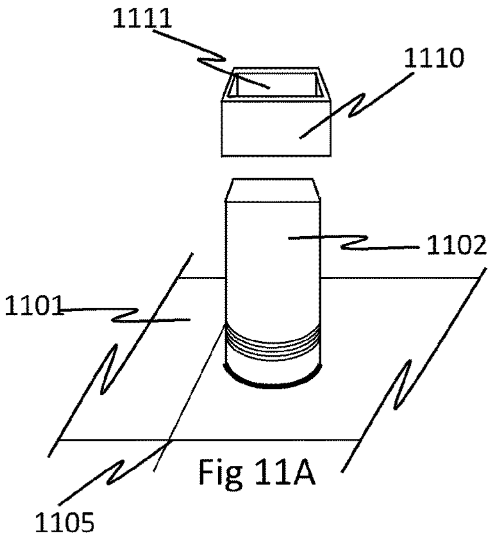
FIGS. 11*a*, 11*b*, 11*c* and 11*d* provide schematic diagrams depicting steps of a piano string tuning process using a tuning pin tool in accordance with alternative embodiments of the invention.

A section of a pinboard 1101 is shown in which a tuning pin 1102 is inserted and which is attached to a piano string 1105, as described above. In FIG. 11*a*, a sheath 1110 is also shown comprising a through hole 1111 configured to receive a tuning pin.

Figure 11B:
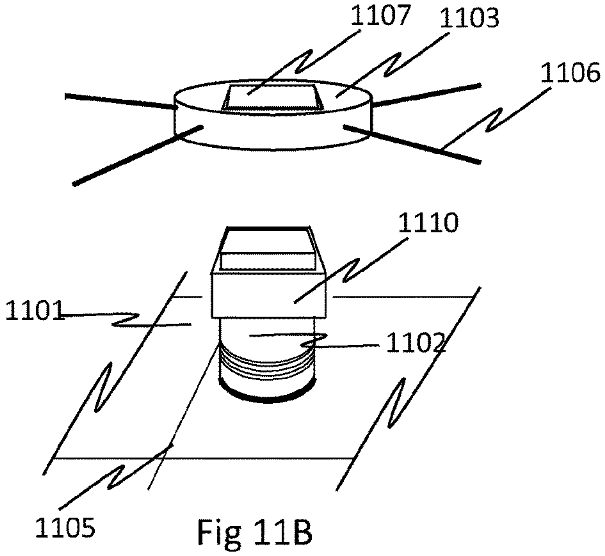

FIG. 11*b* shows a tuning pin 1102 on which a sheath 1110 has been fitted such that the tuning pin 1102 extends through the through hole 1111 of the sheath 1111.

Figure 11C:
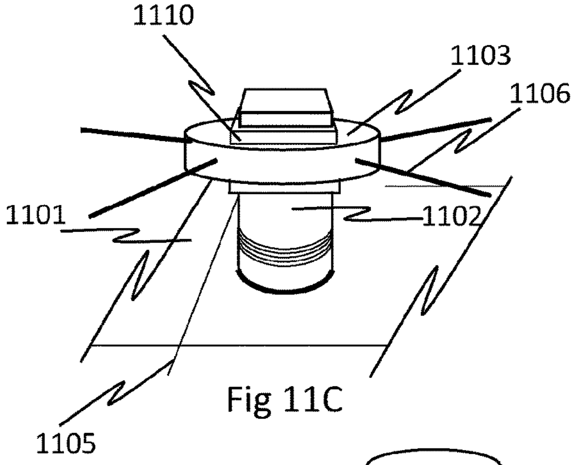

FIG. 11*c* shows a tuning pin 1102 on which a sheath 1110 and a tuning pin tool 1103 have been positioned such that the tuning pin tool 1103 is fitted over the sheath 1110 and the tuning pin 1103. Both the sheath 1110 and the tuning pin 1103 extend through the through hole 1107 of the tuning pin tool 1103, providing a tighter fit between the tuning pin tool 1103 and the tuning pin 1102.

Figure 11D:
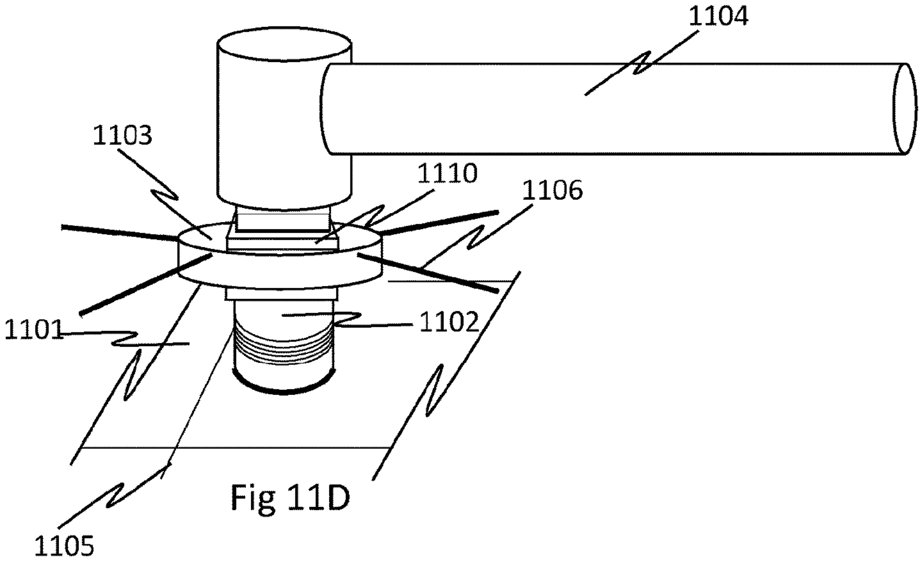

FIG. 11*d* shows the tuning pin tool 1103 and sheath 1110 in place on a tuning pin 1102 onto which a tuning lever 1104 is in place.

Figure 12:
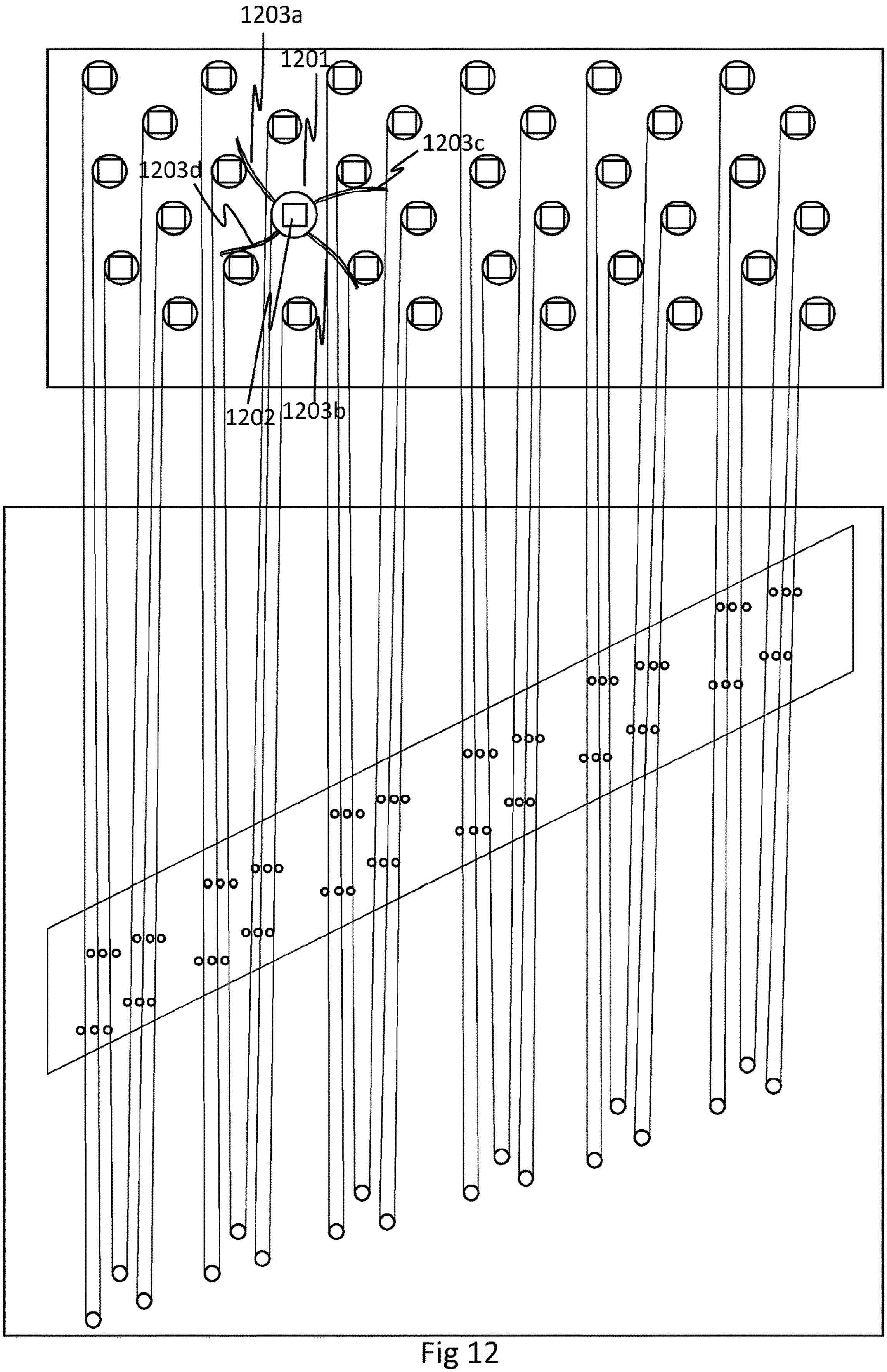
FIG. 12 provides a simplified schematic diagram of a tuning pin tool fitted in accordance with certain embodiments of the invention.

FIG. 12 provides a schematic diagram depicting a section of a pinblock and sound board corresponding to that described with reference to FIG. 1 and in which a tool 1201 has been fitted to a tuning pin 1202 during a tuning process as described above.

Tension in the piano string generally imparts an anti-clockwise rotational force on the tuning pin 1202. In a tuning pin that is tightly fitted in a non-enlarged pinboard hole, this force is resisted by the friction between the tuning pin and the pinboard hole. However, in an enlarged hole, the friction is reduced which may lead to the tuning pin rotating in the direction of this force during a tuning process once the tuning lever has been removed.

To resist this the flexible resilient arms 1203*a*, 1203*b*, 1203*c*, 1203*d* of the tool 1201 are selectively positioned to engage with adjacent tuning pins. In the example shown in FIG. 12, rotational movement of the tuning pin engaging portion of the tool in an anti-clockwise direction is resisted by the resilience of the first 1203*a*, second 1203*b* arm, third 1203*c* and fourth 1203*d* arm.

Once the tool 1201 has been thus positioned it can be left in place.

Figure 13:
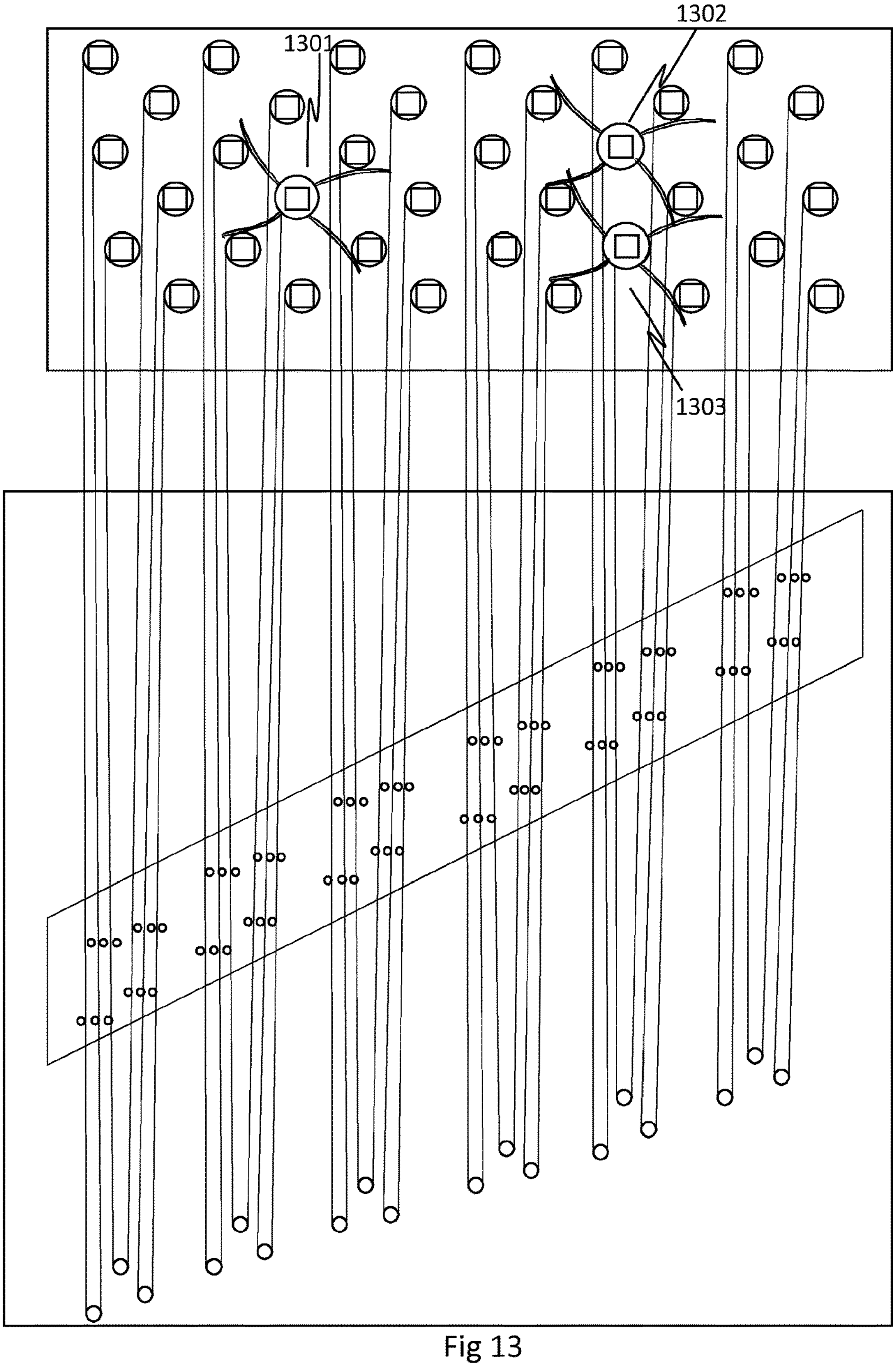
FIG. 13 provides a simplified schematic diagram of a number of tuning pin tools fitted in accordance with certain embodiments of the invention.

As will be understood, multiple tools in accordance with embodiments of the invention can be fitted to an instrument to inhibit the movement of tuning pins. FIG. 13 provides a schematic diagram showing a section of a pinblock and sound board corresponding to that described with reference to FIG. 1 and in which multiple tools 1301, 1302 and 1303 have been fixed in place in the same instrument.

Figure 14:
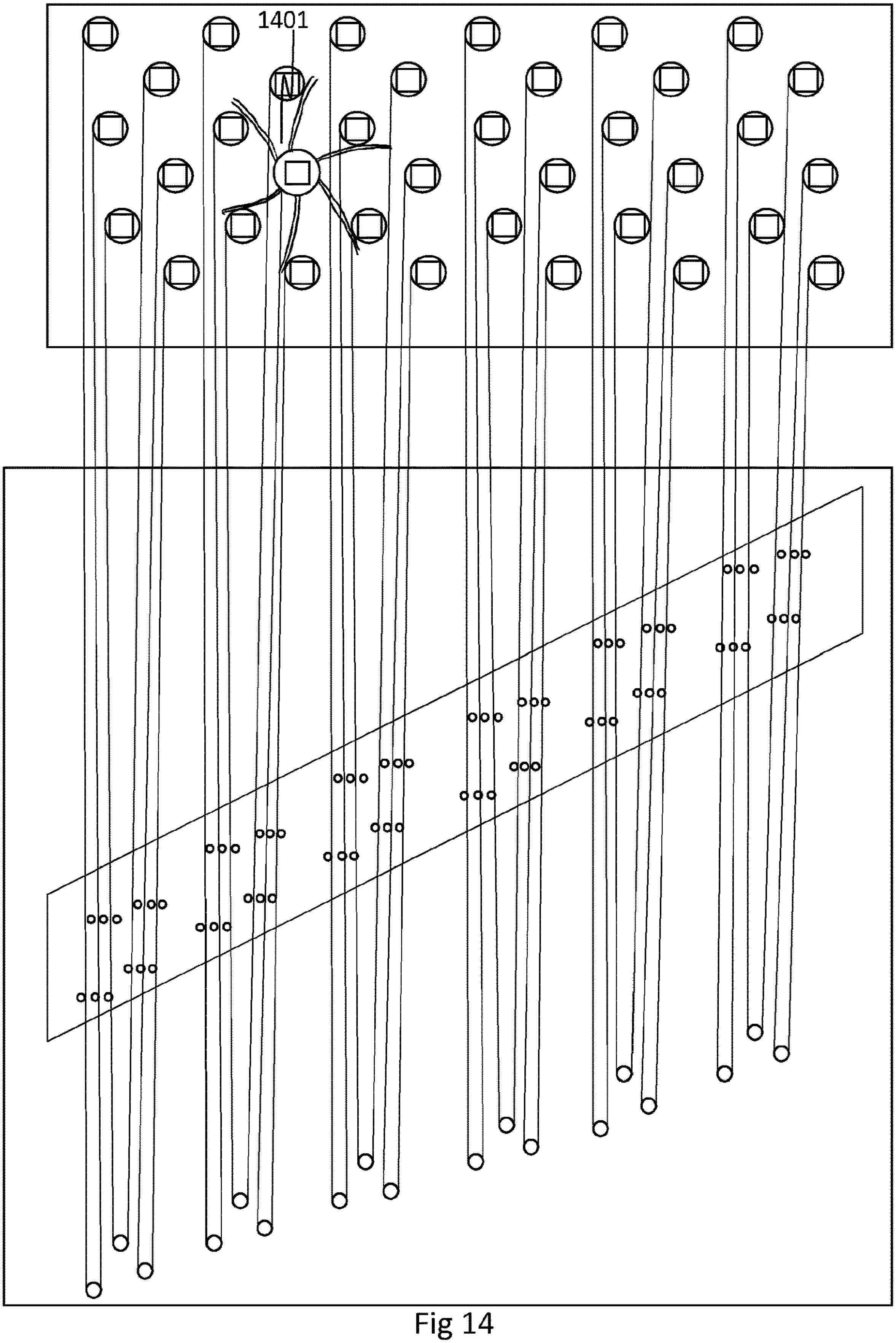
FIG. 14 provides a simplified schematic diagram of tuning pin tool comprising six arms in accordance with certain embodiments of the invention.

In the examples described above, the tool has been shown with four resilient arms. However, in other embodiments, tools with different numbers of arms can be provided. FIG. 14 provides a schematic diagram depicting such an example in which a tool 1401 in accordance with certain embodiments of the invention has been fixed to an instrument and which has six arms. Typically, tools in accordance with embodiments will have a minimum of at least two arms.

Figure 15:
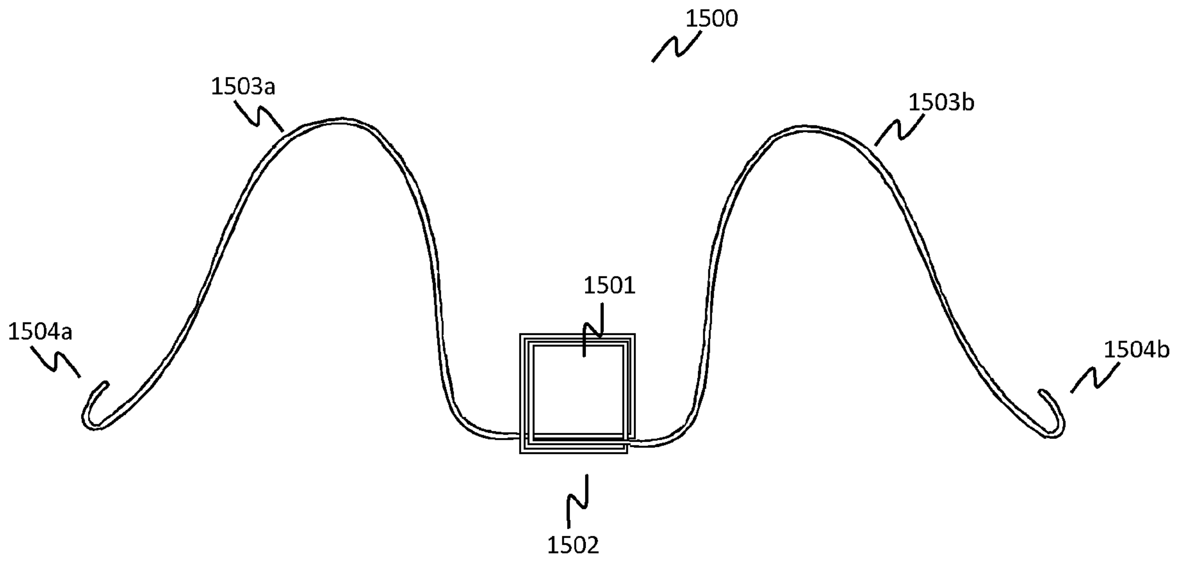
FIG. 15 shows a simplified schematic diagram depicting a tuning pin tool in accordance with a further embodiment of the present invention.

FIG. 15 provides a simplified schematic diagram depicting a tuning pin tool 1500 in accordance with a further embodiment of the present invention.

The tuning pin tool 1500 is formed from a single piece of wire. A coil of the single piece of wire forms a tuning pin engaging portion 1502 which comprises a through hole 1501 configured to receive a tuning pin.

Extending from the tuning pin engaging portion 1502 are elongate lengths of wire forming flexible resilient arms 1503*a*, 1503*b*. Each flexible resilient arms 1503*a*, 1503*b* includes a resilient bend. The flexible resilient arms 1503*a*, 1503*b* extend from the coil forming the tuning pin engaging portion in substantially opposite directions and are of substantially the same length.

Each flexible resilient arm 1503*a*, 1503*b* is a continuation of one end of the single piece of wire. A hook 1504*a*, 1504*b* is located at the distal end of each flexible resilient arms 1503*a*, 1503*b*. The hooks 1504*a*, 1504*b* are configured to engage with the neighbouring piano strings.

In certain examples, the flexible resilient arms 1503*a* and 1503*b* are substantially 8 cm in length.

Figure 16:
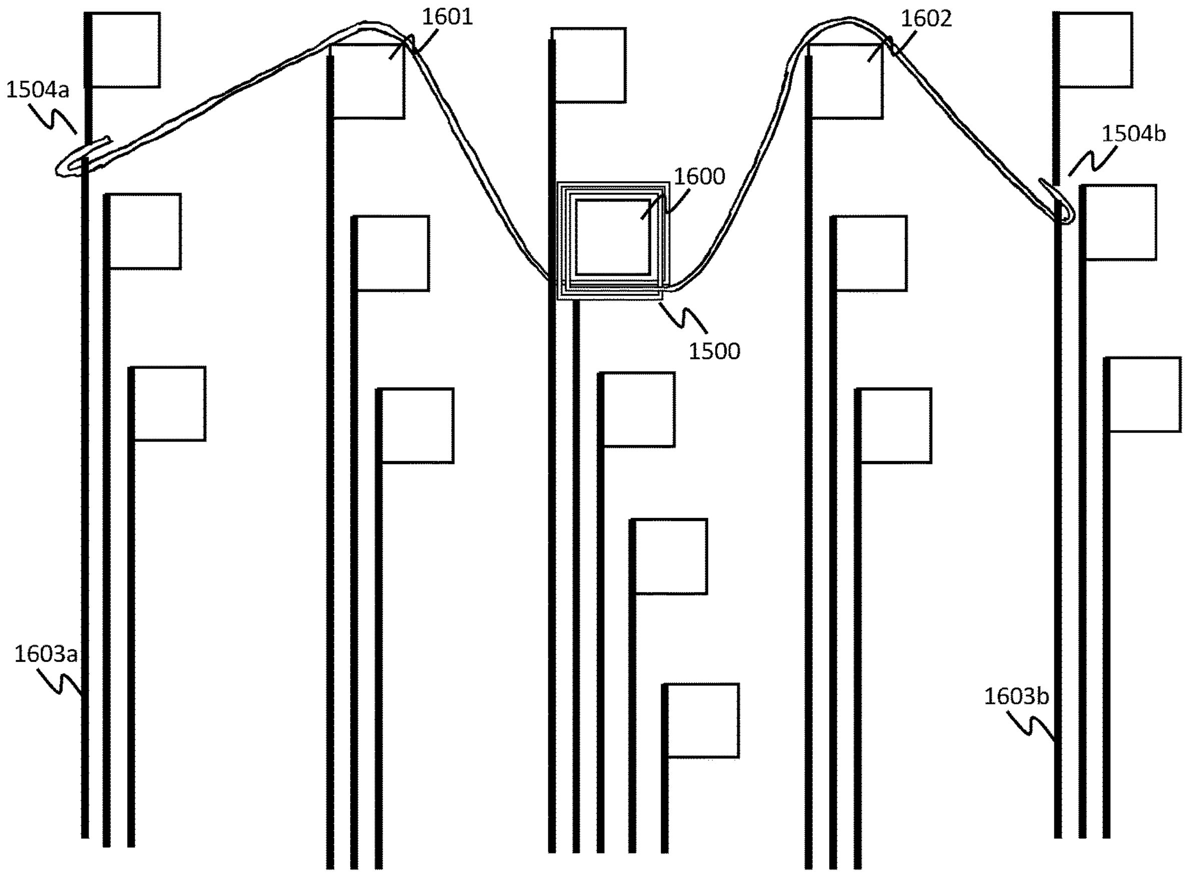
FIG. 16 provides a simplified schematic diagram showing the tuning pin tool according to the embodiment depicted in FIG. 15 when in use on a tuning pin.

FIG. 16 provides a simplified schematic diagram depicting the use of the tuning pin tool 1500 described with reference to FIG. 15.

The tuning pin tool 1500 is positioned on a tuning pin 1600 of a pin board and the flexible resilient arms 1503*a*, 1503*b* are positioned around adjacent pins 1601, 1602 using the resilient bend in each flexible resilient arm 1503*a*, 1503*b*. As can be seen from FIG. 16, by virtue of the configuration of the resilient bends, each flexible resilient arm 1503*a*, 1503*b* engages with the adjacent tuning pin forming a pivot point.

Each hook 1504*a*, 1504*b* is then hooked around an adjacent string 1603*a*, 1603*b*. Typically each hook 1504*a*, 1504*b* goes under then over each adjacent string 1603*a*, 1603*b*. Typically, the pivot point formed by the resilient bend engaging with the adjacent pin, gives rise to a force which urges each hook 1504*a*, 1504*b* against the string with which it is engaged.

As will be understood, the tuning pin tool, thus arranged, imparts a force on the tuning pin 1600 to inhibit its rotation.

Figure 17:
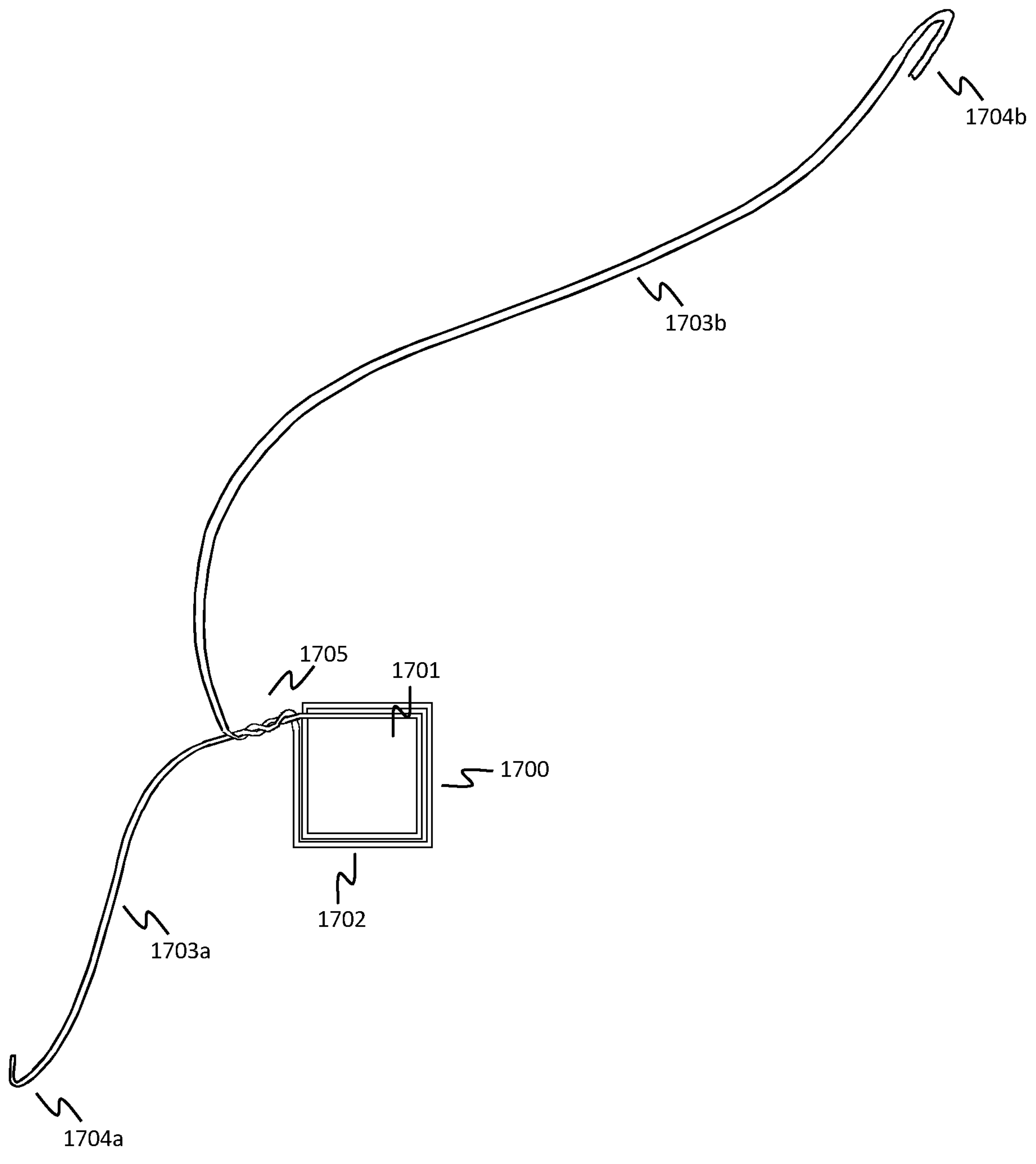
FIG. 17 shows a simplified schematic diagram depicting a tuning pin tool in accordance with a further embodiment of the present invention.

FIG. 17 provides a simplified schematic diagram of a tuning pin tool 1700 in accordance with a further embodiment of the invention.

In keeping with the embodiment describe with reference to FIG. 15, the tuning pin tool 1700 is formed from a single piece of wire, and a coil of this wire forms a tuning pin engaging portion 1702 which comprises a through hole 1701 configured to receive a tuning pin. Extending from the tuning pin engaging portion 1702 are elongate lengths of wire forming flexible resilient arms 1703*a*, 1703*b* each of which include a resilient bend to aid positioning. Each flexible resilient arm 1703*a*, 1703*b* is a continuation of one end of the single piece of wire. A hook 1704*a*, 1704*b* is located at the distal end of each flexible resilient arms 1503*a*, 1503*b*. The hooks 1504*a*, 1504*b* are configured to engage with the neighbouring piano strings.

In contrast to the embodiment described with reference to FIG. 15, the proximal ends of each flexible resilient arm 1703*a*, 1703*b* emerge from the coil forming the tuning pin engaging portion 1702 at the same point and are twisted together in a twisted portion 1705. The flexible resilient arms 1703*a*, 1703*b* are of different lengths: a first flexible resilient arm 1703*a* is shorter, and a second of the flexible resilient arms 1703*b* is longer. In certain examples, the first flexible resilient arm 1703*a* is substantially 4 cm in length and the second flexible resilient arm 1703*b* is substantially 8 cm in length.

Figure 18:
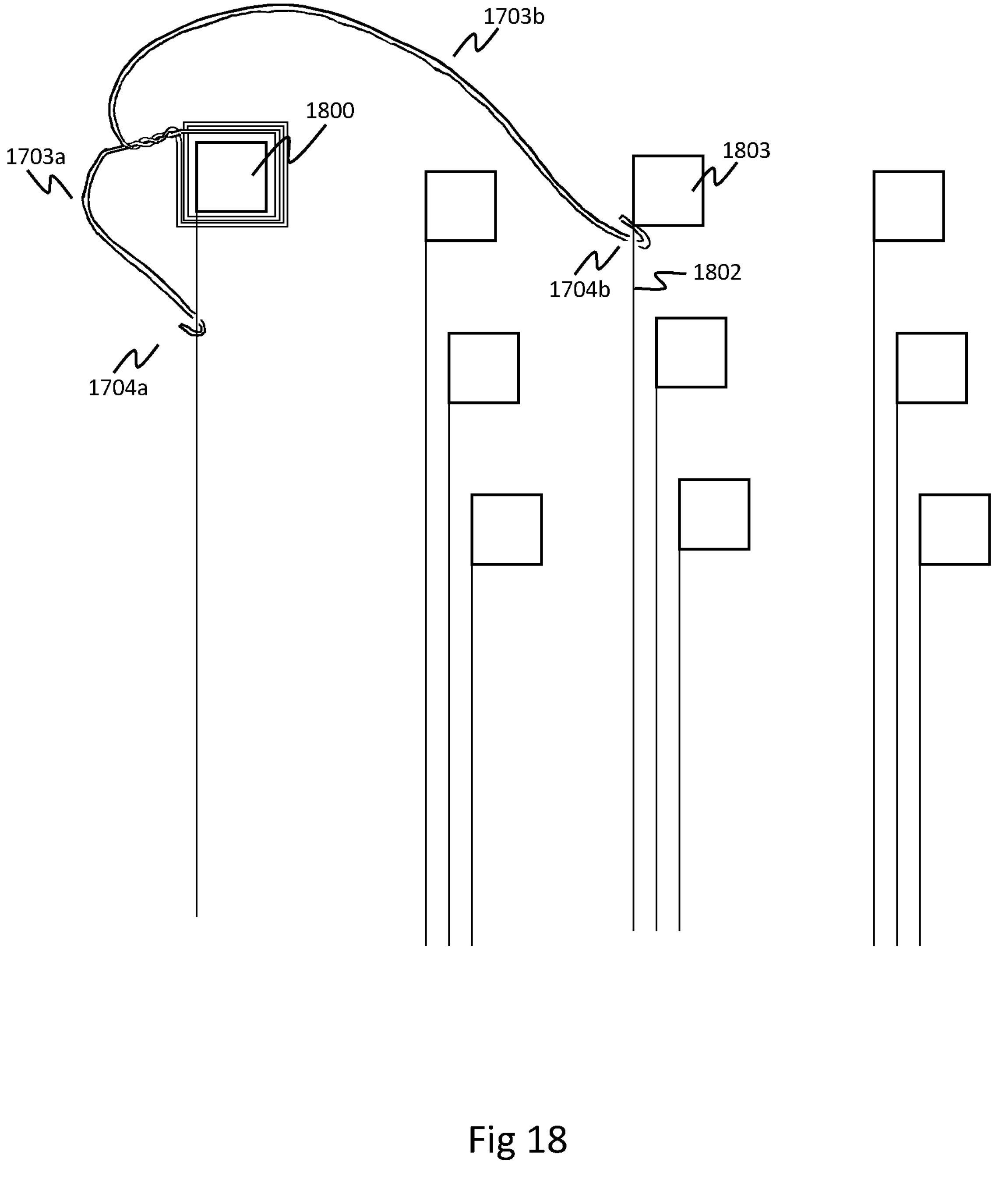
FIG. 18 provides a simplified schematic diagram showing the tuning pin tool according to the embodiment depicted in FIG. 17 when in use on a tuning pin.

The tuning pin tool described with reference to FIG. 17 is configured to engage with tuning pins at the edge of the tuning pin board. FIG. 18 provides a schematic diagram depicting the use of the tuning pin tool used in this way.

The tuning pin tool 1700 is positioned on a tuning pin 1800 of a pin board which is situated at the edge of the pin board. The hook 1704*a* of the shorter of the two flexible resilient arms 1703*a* is configured to engage with the string 1801 of the pin 1800 to which the tool 1701 is attached. The longer of the two flexible resilient arms 1703*b* is guided around the tuning pin 1800 to which the tuning pin tool 1700 is attached and the hook 1704*b* of this arm 1703*b* is then hooked around the string 1802 of an adjacent pin 1803.

As will be understood, the tuning pin tool 1800, thus arranged, imparts a force on the tuning pin 1800 to inhibit its rotation.

As described above, in certain embodiments of the invention, a hook is provided at the distal end of the flexible resilient arms of the tuning pin tool.

Figure 19A:
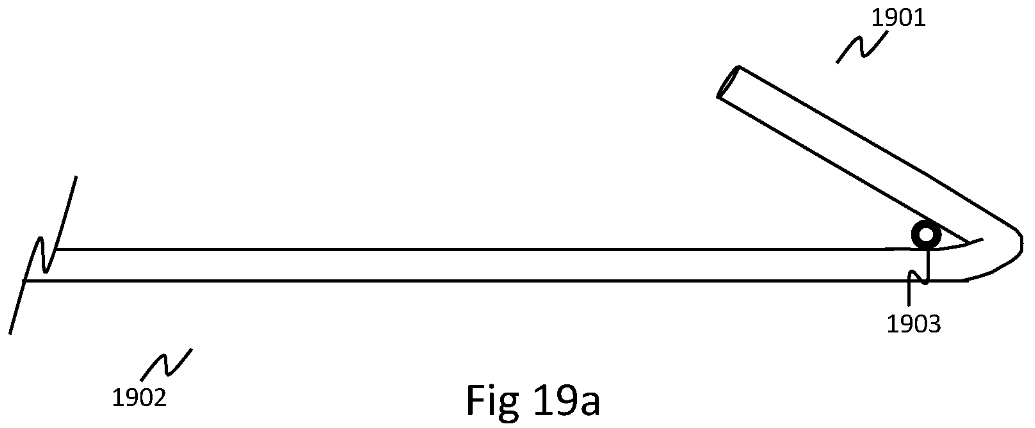
FIGS. 19*a* and 19*b* provide views of a hook used on a tuning pin tool in accordance with certain embodiments of the invention.
Figure 19B:
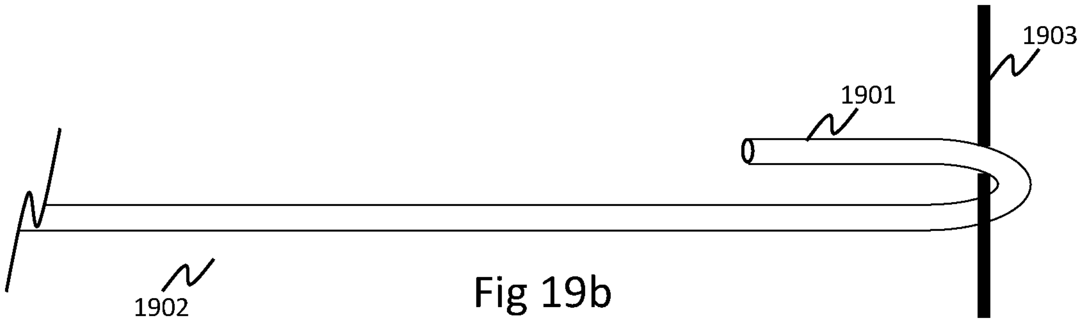

FIGS. 19*a* and 19*b* Provide simplified schematic diagrams depicting the configuration of such hooks in accordance with certain embodiments of the invention.

FIG. 19*a* provides a side on view of such a hook 1901 (that is, substantially along the same plane as the piano strings) and FIG. 19*b* provides a view of the same hook 1901 from above.

As can be seen from FIG. 19*a* (providing the side view), the hook is tilted up from the plane of the flexible resilient arm 1902. That is, in the region of the wire where it bends round to form the hook, the angle of the axis of the wire increases with respect to the plane of the flexible resilient arm 1902.

In certain embodiments, this results in a hook with an angle relative to the plane of the flexible resilient arm 1902 of approximately 30 degrees.

Advantageously, as shown in FIGS. 19*a* and 19*b* the hook 1901, thus configured, can readily engage with a piano string 1903, specifically if the hooked is hooked onto the piano string from the underside of the string (the side of the string closest to the pin board).

In the embodiments described, for example, with reference to FIGS. 12, 13 and 14, in use, the flexible resilient arms of the tool engage with adjacent tuning pins to provide a force which inhibits movement of the tuning pin. As will be understood, in use, in the embodiment described with reference to FIGS. 15 and 16, the flexible resilient arms of the tool engage with adjacent tuning pins (by virtue of the resilient bends) in combination with the hooks engaging with adjacent strings to provide a force which inhibits movement of the tuning pin. Further, as will be understood, in the embodiment described with reference to FIGS. 17 and 18, in use, the hooks engage with adjacent strings to provide a force which inhibits movement of the tuning pin.

The skilled person will understand that the tuning pin tools arranged in accordance with the embodiments described with reference to FIGS. 15, 16, 17 and 18 can be fitted to a tuning pin in substantially the same way as described with reference to FIGS. 9*a*, 9*b* and 9*c*. It will be understood that the size of the through hole, and the resilience of the coil forming the tuning pin engaging portion, ensures that the tuning pin tool is fixed in place.

In the examples described with reference to FIGS. 2*a*, 2*b*, 3*a*, 3*b*, 4*a*, 4*b*, 5*a*, 5*b*,6*a*, 6*b*, 7, 8, 9*a*, 9*b*, 9*c*, 10*b*, 10*c*, 10*d*, 11*b*, 11*c*, 11*d*, 12, 13, 14, 15 and 16 tools in accordance with embodiments of the invention have been shown with flexible resilient arms of substantially the same length. However, it will be understood that in other embodiments, tools may be provided with flexible resilient arms of one or more different lengths. Examples of tools with flexible resilient arms of different lengths are shown in FIGS. 17 and 18.

Tools in accordance with embodiments of the invention can be used with any suitable instrument comprising a plurality of adjacent tuning pins mounted to a pinboard. Examples include harpsichords, virginals, harps, and spinets.

Tuning pin tools in accordance with certain embodiments of the invention can be adapted for use with other stringed instruments such as violins and guitars in which the tuning pins are provided by tuning pegs.

Figure 20A:
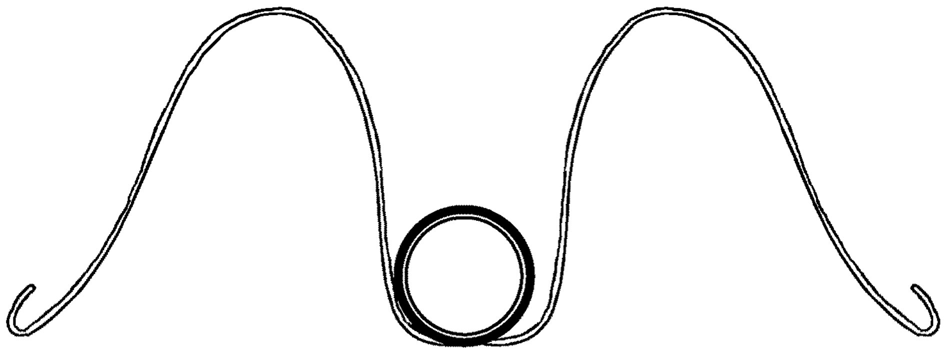
FIG. 20*a* provides a simplified schematic diagram of a tuning pin tool in accordance with certain embodiments of the invention.

In the embodiments described with reference to FIGS. 15, 16, 17 and 18, the tuning pin engaging portion formed from a coil of wire which has a substantially square cross section. However, in other embodiments, the tuning pin engaging portion can have a substantially circular or elliptical cross-section. An example of such an embodiment is depicted schematically in FIG. 20*a* which shows a tuning pin tool with a tuning pin engaging portion with a substantially circular cross section.

Figure 20B:
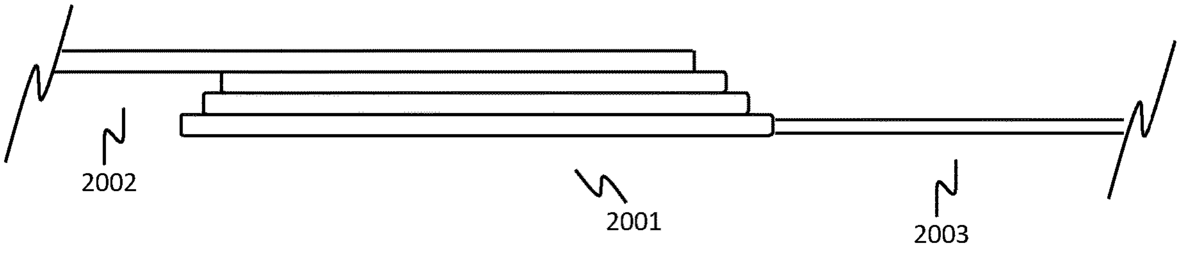
FIG. 20*b* provides a schematic diagram depicting a tuning pin engaging portion of a tuning pin tool in accordance with certain embodiments of the invention.

Typically, the tuning pin engaging portion formed from the coil of wire in the embodiments described with reference to FIGS. 15, 16, 17 and 18 is tapered to provide a tapered through hole. An example of this is in FIG. 20*b* which shows a side view of a such tuning pin engaging portion 2001, along with sections of the flexible resilient arms 2002, 2003.

Typically, the coil of wire forming the tuning pin engaging portion in the embodiments described with reference to FIGS. 15, 16, 17 and 18 comprises multiple coils, for example, 2, 3, 4 or 5 coils. However, in certain embodiments, the tuning pin engaging portion may comprise a single coil.

In certain embodiments, the coils of the coil of wire may form a spring-like configuration.

Figure 21A:
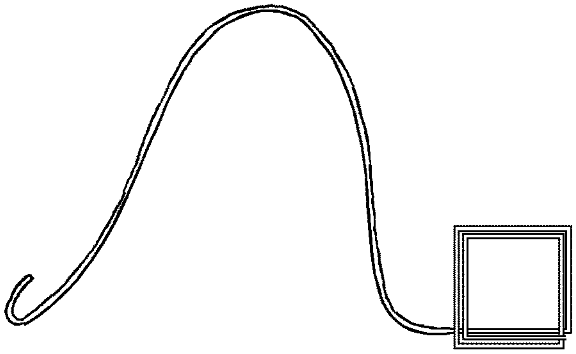
FIGS. 21*a* and 21*b* provide a simplified schematic diagram depicting a tuning pin tool in accordance with certain embodiments of the invention.
Figure 21B:
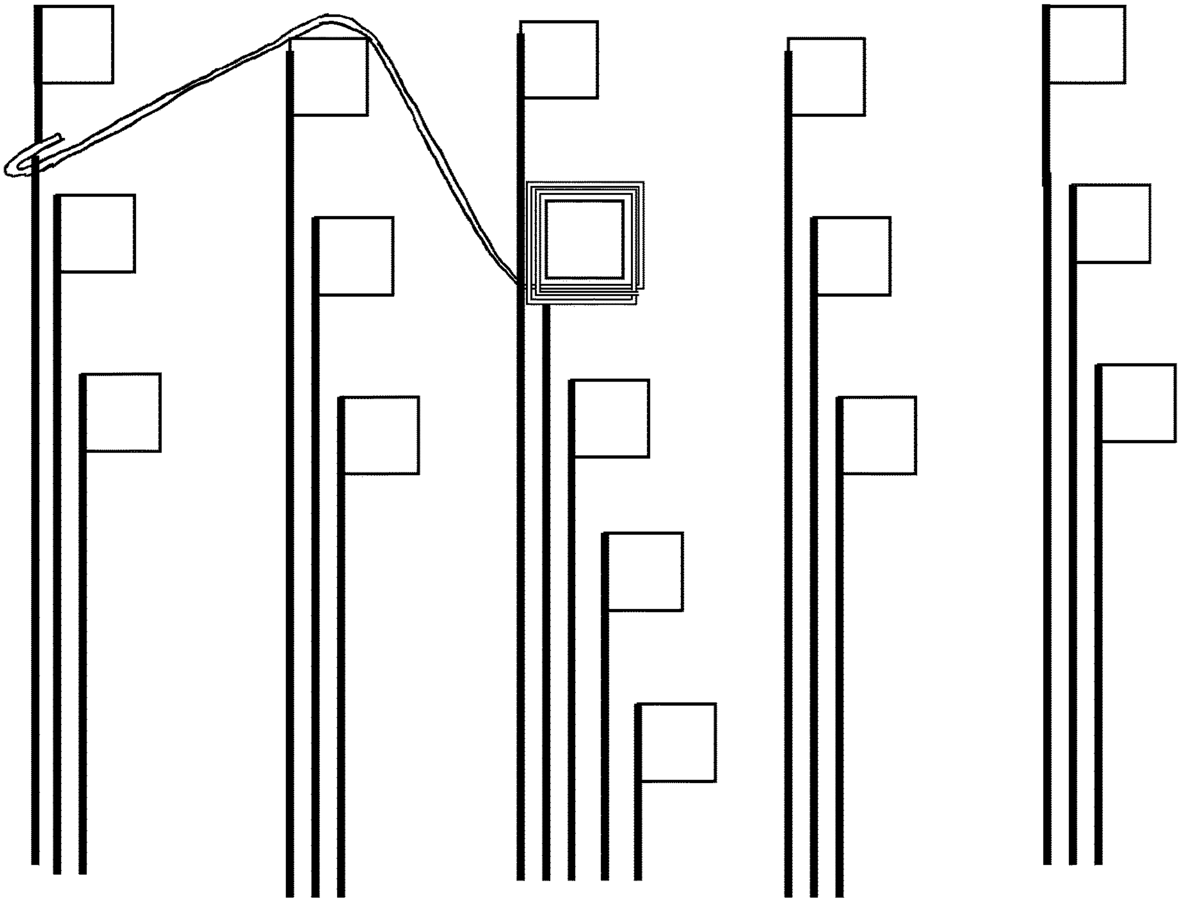

Typically, tuning pin tools in accordance with embodiments of the invention comprises a plurality (two or more) flexible resilient arms. However, in certain embodiments, a tuning pin tool may be provided, corresponding to the tuning pin tool described with reference to FIGS. 15 and 16, that comprises a single arm. An example of such an embodiment is shown in FIGS. 21*a* and 21*b*.

Tools in accordance with embodiments of the invention can be manufactured by any appropriate method. The skilled person would understand that such methods include but are not limited to 3D printing. Tuning pin tools in accordance with embodiments of the invention may be mass-manufactured by automated means or alternatively, manufactured by manual means. Embodiments in which the tuning pin tool is made from a single length of wire may be particularly easily manufactured at low cost.

The wire from which the tuning pin tools described with reference to FIGS. 4*a*, 4*b*, 4*c*, 5*a*, 5*b*, 5*c*, 6*a*, 6*b*. 6*b*, 15, 16, 17, 18, 20*a*, 20*b*, 21*a* and 21*b* are made, can be formed any suitable resilient material, for example metal such as copper or steel. In certain examples, this steel is hardened steel. Such wire can be of any suitable cross-sectional diameter, for example from substantially 0.5 mm to 2.5 mm. The width may be selected in dependence on the resilience and flexibility of the material from which the wire is made and other factors such as the number of coils in the tuning pin engaging portion. For example, a tuning pin engaging portion with fewer coils (for example one or two coils), may be made from wire with a thicker cross-sectional diameter, for example 2 mm.

Advantageously, embodiments in which the tuning pin engaging portion of the tuning pin tool comprise a coil of wire (as described, for example, with reference to FIGS. 15, 16, 17, 18, 20*a*, 20*b*, 21*a* and 21*b*), typically take up less space when fitted than embodiments in which the tuning pin engaging portion of the tuning pin tool comprises a main body made, for example, from steel, brass, chrome or hardened plastic (as described, for example, with reference to FIGS. 2*a* and 2*b*). Thus, embodiments in which the tuning pin engaging portion of the tuning pin tool comprise a coil of wire may more readily be fitted to directly adjacent tuning pins.

Figure 22:
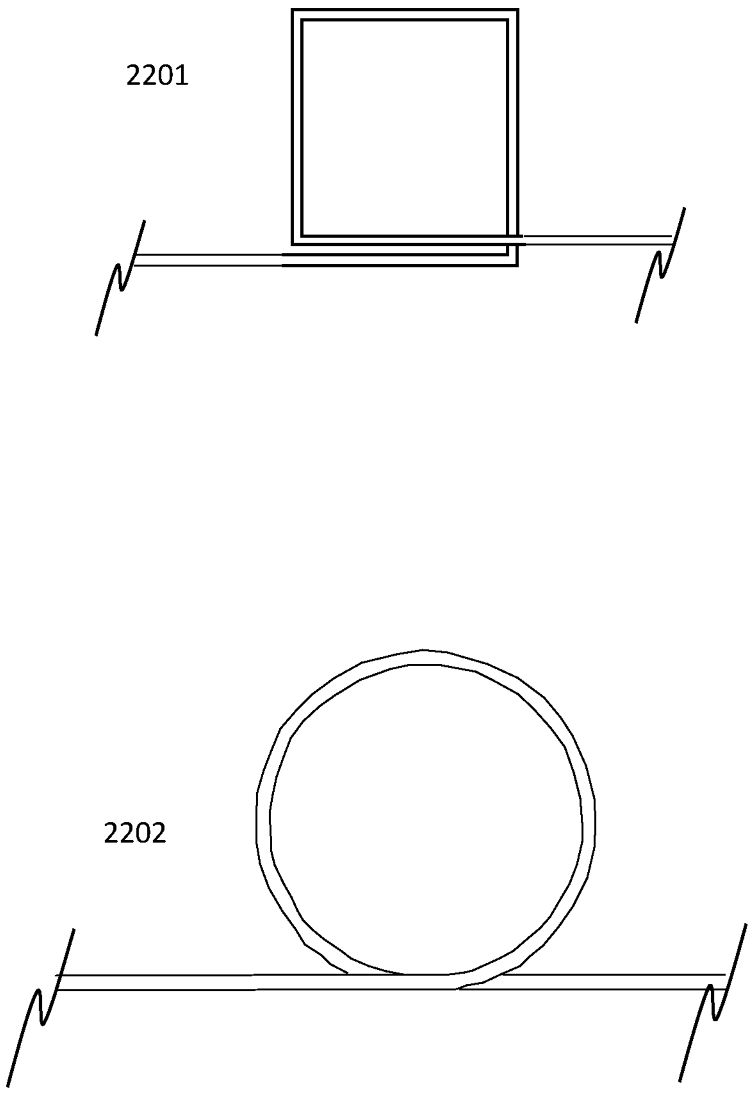
FIG. 22 provides schematic diagrams depicting tuning pin engaging portions of tuning pin tools in accordance with embodiments of the invention comprising a single coil.

In the examples shown in FIGS. 15, 16, 17, 18, 20*a*, 20*b*, 21*a* and 21*b*, the coil of wire forming the tuning pin engaging portion is shown comprising several coils. However, as described above, in alternative embodiments a tuning pin tool can substantially correspond to one of the examples shown in in FIGS. 15, 16, 17, 18, 20*a*, 20*b*, 21*a* and 21*b* except that the coil of wire forming the tuning pin engaging portion comprises only a single coil. FIG. 22 provides a schematic diagram showing an example of such a tuning pin engaging portion 2201 that has a substantially square cross-section and comprises a single coil, and an example of a tuning pin engaging portion 2202 that has a substantially circular cross-section and comprises a single coil.

All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims are generally intended as "open" terms (e.g., the term "including" or "comprising" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

It will be appreciated that various embodiments of the present disclosure have been described herein for purposes of illustration, and that various modifications may be made without departing from the scope of the present disclosure. Accordingly, the various embodiments disclosed herein are not intended to be limiting, with the true scope being indicated by the following claims.

The invention claimed is:

1. A tool for fitting to a tuning pin of an instrument for inhibiting movement of the tuning pin, said tool comprising:
- a single piece of wire comprising:
  - a tuning pin engaging portion formed by a coil of the single piece of wire that defines a through hole for engaging a tuning pin, and
  - at least one flexible resilient arm that is integral with and extends from the tuning pin engaging portion, wherein the at least one flexible resilient arm is configured, in use, to engage with other tuning pins adjacent to the tuning pin to inhibit movement of the tuning pin.

2. A tool according to claim 1, wherein the through hole is configured to engage with a piano tuning pin.

3. A tool according to claim 1, wherein the at least one flexible resilient arm comprises at least two flexible resilient arms, each of the at least two flexible resilient arms being formed from the single piece of wire integrally with the tuning pin engaging portion.

4. A tool according to claim 3, wherein each of the flexible resilient arms is at least 5 cm in length, and wherein each of the flexible resilient arms extends from the coil of the single piece of wire that forms the tuning pin engaging portion in opposite directions.

5. A tool according to claim 1, wherein the through hole is tapered.

6. A tool according to claim 1, wherein the through hole has a substantially square or hexagonal cross-section.

7. A tool according to claim 1, wherein the through hole is configured such that when fitted to the tuning pin, a protruding section of the tuning pin protrudes from the tool to allow a tuning lever to engage with the protruding section of the tuning pin.

8. A tool according to claim 1, further comprising a second piece of wire forming a second flexible resilient arm that extends from the tuning pin engaging portion.

9. A tool according to claim 1, wherein the tool further comprises a stabilising member.

10. A tool according to claim 1, wherein the at least one flexible resilient arm comprises metal wire.

11. A tool according to claim 10, wherein the metal wire is copper wire.

12. A tool for fitting to a tuning pin of an instrument for inhibiting movement of the tuning pin, said tool comprising:
- a tuning pin engaging portion comprising a through hole for engaging a tuning pin, and
- a plurality of flexible resilient arms extending from the tuning pin engaging portion and configured, in use, to engage with other tuning pins adjacent to the tuning pin to inhibit movement of the tuning pin; and
- wherein the flexible resilient arms further comprise a coiled region.

13. A method of tuning an instrument string of an instrument, said method comprising
- fitting a tool on to a first tuning pin of the instrument, the tool comprising:
  - a single piece of wire comprising:
    - a tuning pin engaging portion formed by a coil of the single piece of wire that defines a through hole for engaging the first tuning pin, and
    - at least one flexible resilient arm that is integral with and extends from the tuning pin engaging portion, wherein the at least one flexible resilient arm is configured, in use, to engage with further tuning pins adjacent to the first tuning pin to inhibit movement of the tuning pin;
- placing a tuning lever on the first tuning pin and tuning a string connected to the first tuning pin;
- tuning the string with the tuning lever;
- positioning the at least one flexible resilient arm of the tool to engage with the further tuning pins adjacent to the first tuning pin to inhibit movement of the first tuning pin when the tuning lever is removed, and
- removing the tuning lever.

14. A method of tuning an instrument string of an instrument according to claim 13, wherein the method further comprises fitting a positioning piece onto the first tuning pin before the fitting of the tool wherein the tool is positioned on top of the positioning piece.

15. A method of tuning an instrument string of an instrument according to claim 13, wherein the method further comprises fitting a sheath onto the first tuning pin before the fitting of the tool wherein the through hole of the tuning pin engaging portion is positioned over said sheath.

16. A method of tuning an instrument string of an instrument according to claim 13 wherein said instrument is a piano.

* * * * *